US007808683B2

(12) United States Patent
Muraki et al.

(10) Patent No.: US 7,808,683 B2

(45) Date of Patent: Oct. 5, 2010

(54) ELECTRICAL APPLIANCE EQUIPPED WITH LIQUID CRYSTAL DISPLAY

(75) Inventors: Motohito Muraki, Nagoya (JP); Takamitsu Kawai, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 1049 days.

(21) Appl. No.: 11/275,832

(22) Filed: Jan. 31, 2006

(65) Prior Publication Data

US 2006/0170831 A1 Aug. 3, 2006

(30) Foreign Application Priority Data

| | | | |
|---|---|---|---|
| Jan. 31, 2005 | (JP) | ............................. | 2005-023443 |
| Jan. 31, 2005 | (JP) | ............................. | 2005-023444 |
| Feb. 8, 2005 | (JP) | ............................. | 2005-031975 |
| Feb. 8, 2005 | (JP) | ............................. | 2005-031976 |

(51) Int. Cl.
*H04N 1/04* (2006.01)

(52) U.S. Cl. ....................... 358/498; 358/474; 358/496; 358/296

(58) Field of Classification Search ................. 358/498, 358/474, 496, 296; 271/207, 213
See application file for complete search history.

(56) References Cited

U.S. PATENT DOCUMENTS

| | | | | |
|---|---|---|---|---|
| 5,737,097 | A * | 4/1998 | Fujimoto .................... | 358/476 |
| 6,076,923 | A | 6/2000 | Kashimura et al. | |
| 6,714,326 | B1 * | 3/2004 | Yamada ...................... | 358/498 |
| 6,804,858 | B2 | 10/2004 | Yazawa et al. | |
| 2002/0118403 | A1 | 8/2002 | Kameyama et al. | |
| 2002/0146460 | A1 | 10/2002 | Sands et al. | |
| 2003/0146943 | A1 | 8/2003 | Lehmkuhl et al. | |
| 2003/0174834 | A1 | 9/2003 | Kida | |
| 2003/0231367 | A1 * | 12/2003 | Quintana .................... | 358/527 |
| 2004/0146943 | A1 | 7/2004 | Wilkes | |

(Continued)

FOREIGN PATENT DOCUMENTS

| | | | |
|---|---|---|---|
| EP | 1647409 | A2 | 4/2006 |

(Continued)

OTHER PUBLICATIONS

Japan Patent Office, Office Action in Japanese Patent Application No. 2005-023444 (counterpart to the above-captioned U.S. Patent Application) mailed Jan. 28, 2009. (partial translation).

(Continued)

*Primary Examiner*—Houshang Safaipour
(74) *Attorney, Agent, or Firm*—Baker Botts, LLP.

(57) ABSTRACT

An electrical appliance includes an upper and lower main bodies, in which the upper main body is pivotally movable about a side edge of the lower main body to selectively be in an open state in which the top surface of the lower main body is exposed and a closed state in which the upper main body is disposed above the lower main body. A liquid crystal display panel is disposed on the top surface of the lower main body in the vicinity of a side edge near the front surface thereof. A notched opening is formed in the upper main body so that the display surface of the liquid crystal display panel is visible when the upper main body is in the closed state.

30 Claims, 17 Drawing Sheets

U.S. PATENT DOCUMENTS

| | | | |
|---|---|---|---|
| 2004/0217537 | A1 | 11/2004 | Ohama |
| 2004/0266253 | A1 | 12/2004 | Nakagawa |
| 2006/0078366 | A1 | 4/2006 | Kimura et al. |
| 2006/0170831 | A1 | 8/2006 | Muraki et al. |

FOREIGN PATENT DOCUMENTS

| | | | |
|---|---|---|---|
| JP | S63-174075 | A | 7/1988 |
| JP | H02-127453 | U | 10/1990 |
| JP | H04-349765 | A | 12/1992 |
| JP | H04-349766 | A | 12/1992 |
| JP | H05165786 | A | 7/1993 |
| JP | H06-222627 | A | 8/1994 |
| JP | H06-343117 | A | 12/1994 |
| JP | H07-068900 | A | 3/1995 |
| JP | H07-177273 | A | 7/1995 |
| JP | 1996164014 | A | 6/1996 |
| JP | H11-008722 | A | 1/1999 |
| JP | 2000-244616 | A | 9/2000 |
| JP | 2001-063901 | A | 3/2001 |
| JP | 2002-244377 | A | 8/2002 |
| JP | 2002-247176 | A | 8/2002 |
| JP | 2002-249244 | A | 9/2002 |
| JP | 2003103869 | A | 4/2003 |
| JP | 2003-274070 | A | 9/2003 |
| JP | 2003-337506 | A | 11/2003 |
| JP | 2004-235944 | A | 8/2004 |
| JP | 2004-304743 | A | 10/2004 |
| JP | 2004299867 | A | 10/2004 |
| JP | 2005-026845 | A | 1/2005 |
| JP | 2006-137182 | A | 6/2006 |
| JP | 2006-211522 | A | 8/2006 |
| JP | 2006-218650 | A | 8/2006 |
| JP | 2006-218651 | A | 8/2006 |
| JP | 2004-276324 | A | 10/2007 |

OTHER PUBLICATIONS

European Patent Office, European Search Report for Related EP Application No. 06250503 dated Jun. 30, 2006.

Japan Patent Office; Office Action in Japanese Patent Application No. 2005-023443 (counterpart to the above-captioned U.S. patent application) mailed Oct. 14, 2009.

Japanese Patent Office, Office Action for Japanese Patent Application No. 2005-031976 (counterpart to above-captioned U.S. patent application), mailed Apr. 21, 2010.

Japan Patent Office; Office Action in Japanese Patent Application No. 2005-031975 (counterpart to the above-captioned U.S. patent application) mailed Apr. 28, 2010.

* cited by examiner

ELECTRICAL APPLIANCE EQUIPPED WITH LIQUID CRYSTAL DISPLAY

CROSS REFERENCE TO RELATED APPLICATIONS

This application claims priorities to Japanese Patent Application Nos. 2005-023443 filed on Jan. 31, 2005, 2005-023444 filed on Jan. 31, 2005, 2005-031975 filed Feb. 8, 2005, and 2005-031976 filed on Feb. 8, 2005, the contents of which are hereby incorporated by reference into the present application.

Technical Field

The invention relates to a configuration of an electrical appliance such as an image recording device equipped with a liquid crystal display panel capable of displaying data including images, characters and so on thereon.

Background

In conventional electrical appliances including single-function devices such as tape printers, inkjet printers, copiers and facsimiles and multifunction image recording devices having a printing function, copying function, scanning function and facsimile transmitting/receiving function, there has been provided a liquid crystal display unit for providing the user with instructions on achieving various functions of the device and informing the user of the current status of the device, operating procedures, and the like.

A tape printer described in Japanese Patent Application Publication No. HEI-8-164014 includes a main body case, a cover member disposed on the upper surface of the main body case for covering a region that accommodates a cassette case therein, and a liquid crystal display panel. An inkjet printer with an image scanner described in U.S. Pat. No. 6,804,858 (corresponding to Japanese Patent Application Publication No. 2003-103869) includes a main body configured of a lower main body and an upper main body rotatably mounted on the top surface of the lower main body to selectively be in an open state and a closed state. An inkjet printing unit is incorporated into the lower main body. An image scanning unit is incorporated into the upper main body. An operation panel unit with a liquid crystal display panel is disposed on a side of the top surface of the upper main body.

Recent electrical appliances, especially electrical appliances for recording images, have a liquid crystal display panel with an enlarged display area for displaying the entire image to be processed and with a capacity for displaying the image in color.

However, the image recording device described in U.S. Pat. No. 6,804,858 causes the following problem: when the liquid crystal display panel is disposed on the rotatable upper main body, a longer harness for signal or data transmission is required for connecting a control board, that is generally built into the lower main body, to the liquid crystal display panel. This harness tends to pick up noise readily, thereby degrading the performance of the liquid crystal display panel.

Furthermore, when performing such operations as maintenance and the replacement of parts, ink cartridges, and other consumable items while the upper main body is opened relative to the lower main body, the user must be able clearly to see messages with instructions for operating procedures and the like on the liquid crystal display panel.

To solve these problems, the liquid crystal display panel is preferably disposed on the top surface of the lower main body.

However, the liquid crystal display panel arranged in this way must not be blocked from view when the upper main body is closed.

Furthermore, it is preferable that the upper main body be shaped substantially the same as the lower main body in a plan view in order to achieve a more compact device overall.

SUMMARY

To solve these problems, it is an object of the invention to provide an electrical appliance capable of improving the utility of the liquid crystal display panel disposed on the top surface of the lower main body.

To achieve the above and other objects, an electrical appliance in accordance with the invention includes an upper main body, a lower main body, and a liquid crystal display panel disposed on the top surface of the lower main body. The upper main body is pivotally movable about a first side edge of the lower main body to selectively be in an open state in which the top surface of the lower main body is exposed and a closed state in which the top surface of the lower main body is unexposed by the upper main body disposed above the lower main body. The upper main body is formed with an opening so that the display surface is visible from outside of the upper main body when the upper main body is in the closed state.

BRIEF DESCRIPTION OF THE DRAWINGS

The particular features and advantages of the invention as well as other objects will become apparent from the following description taken in connection with the accompanying drawings, in which.

DETAILED DESCRIPTION

Figure 1:
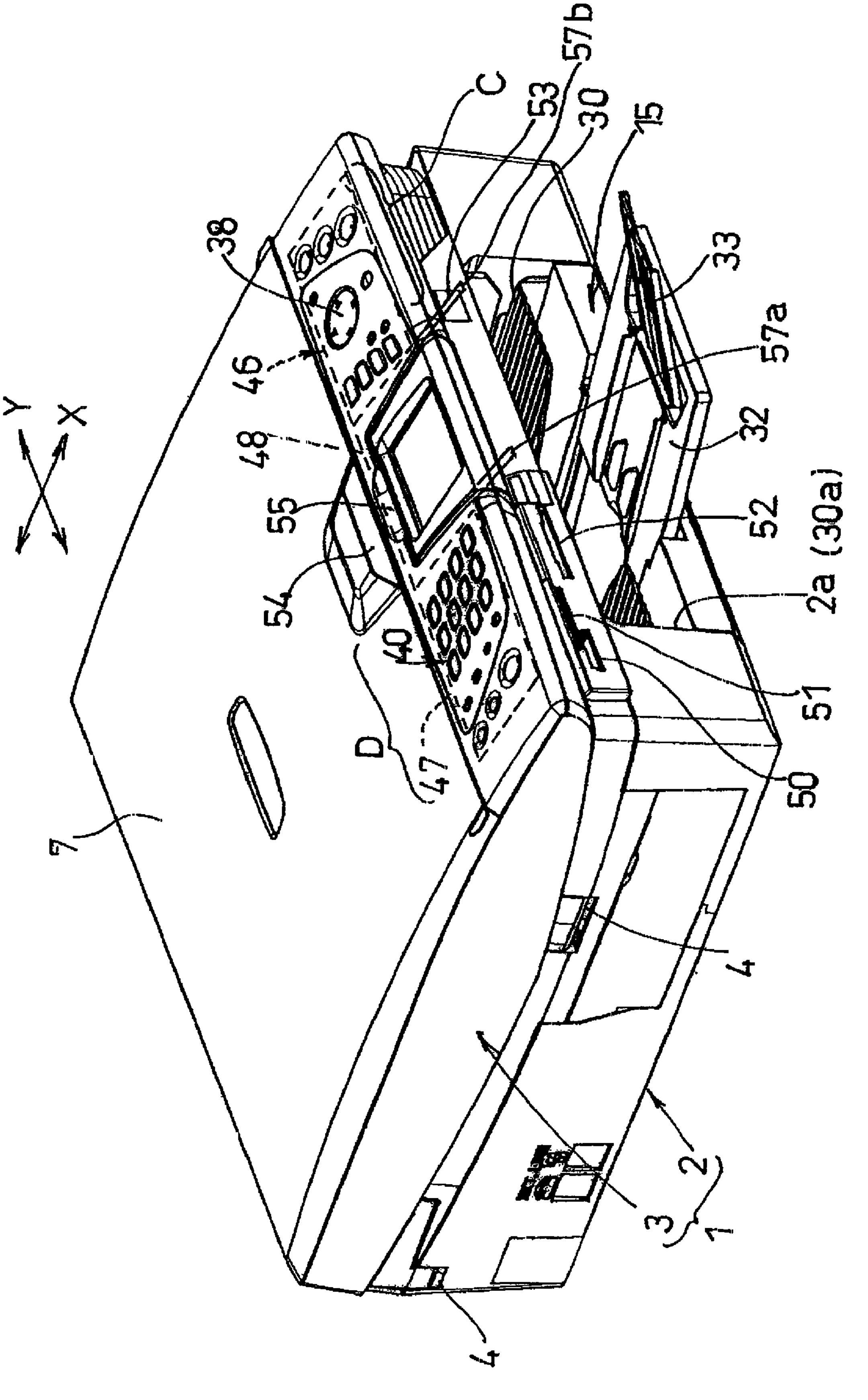
FIG. 1 is a perspective view showing an image recording device in accordance with a first illustrative example of the invention.
Figure 2:
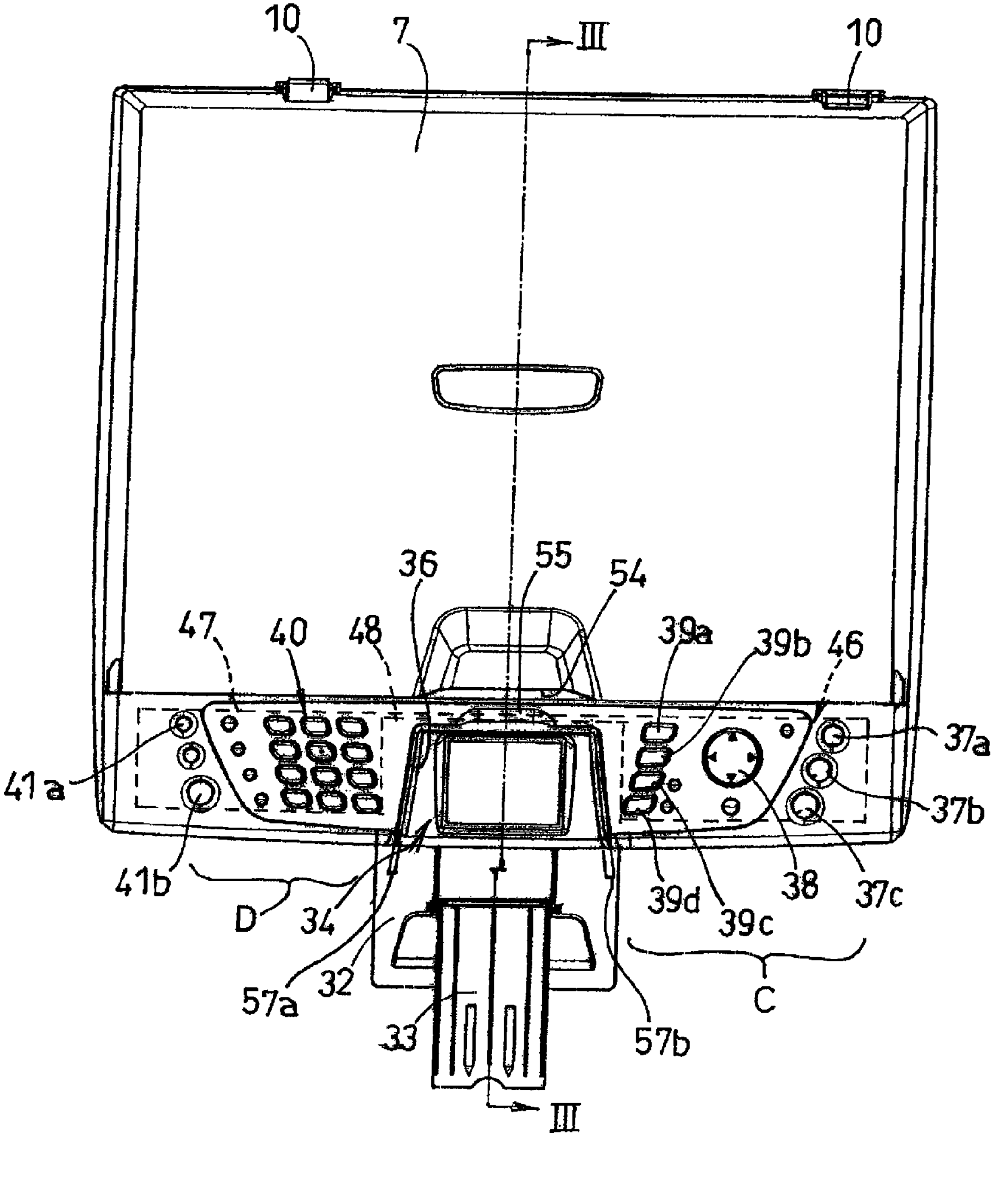
FIG. 2 is a plan view showing the image recording device in accordance with the first illustrative example of the invention.
Figure 3:
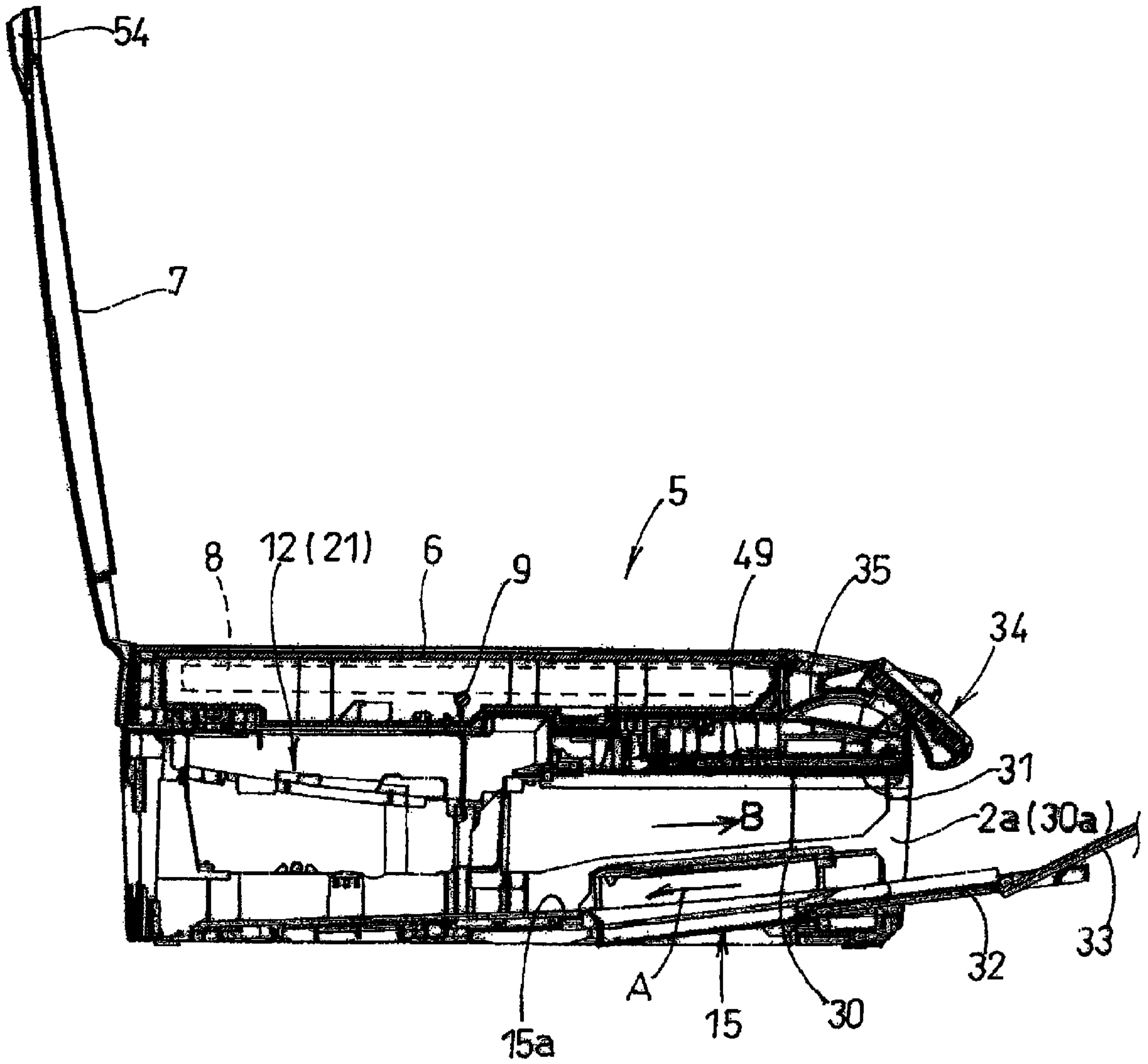
FIG. 3 is a side sectional view showing the image recording device of the first illustrative example in the state where a scanner's cover member is opened, taken along a line III-III in FIGS. 2 and 9.
Figure 4:
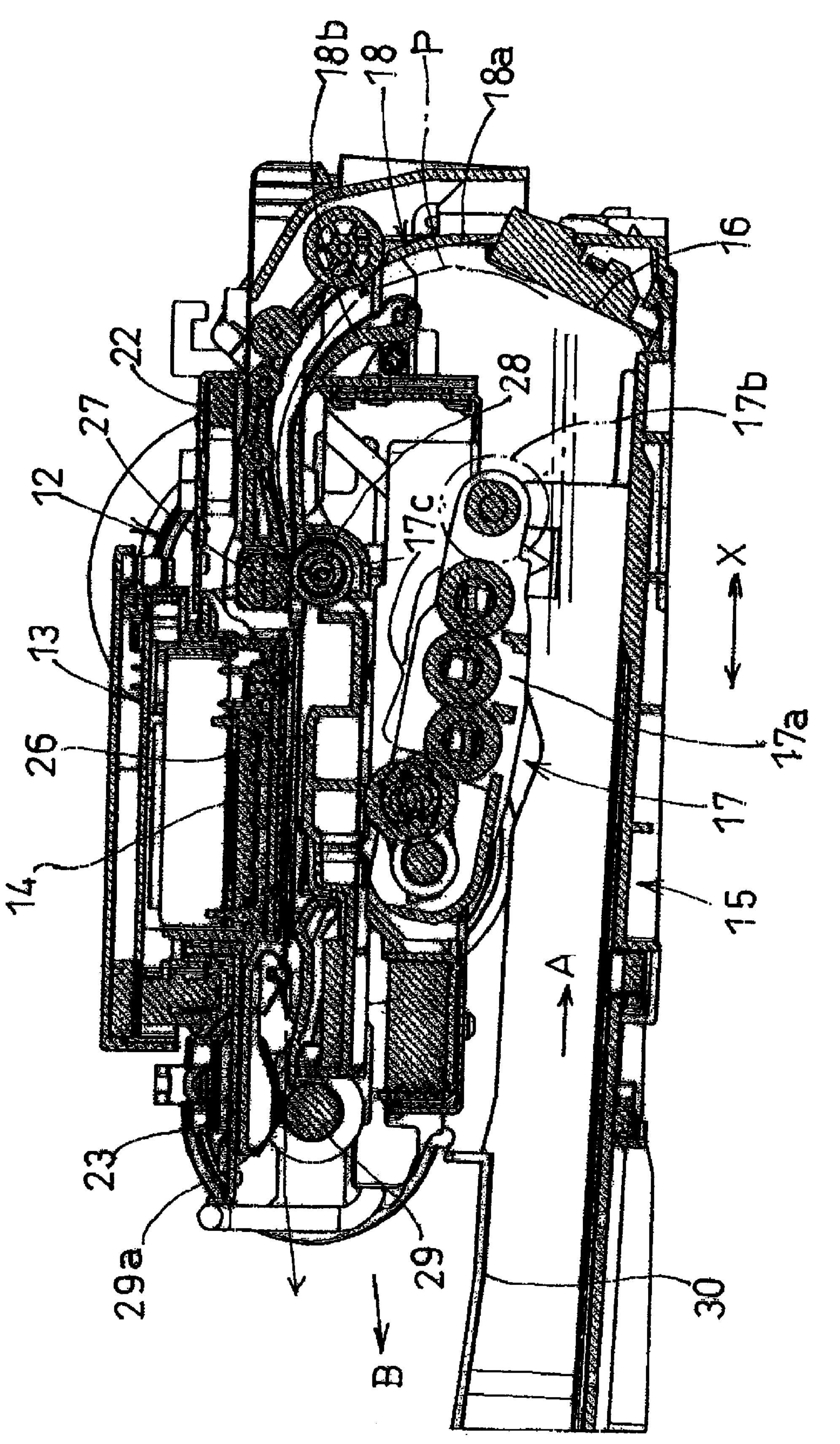
FIG. 4 is an enlarged side sectional view showing a recording unit and a sheet feeding unit.
Figure 5:
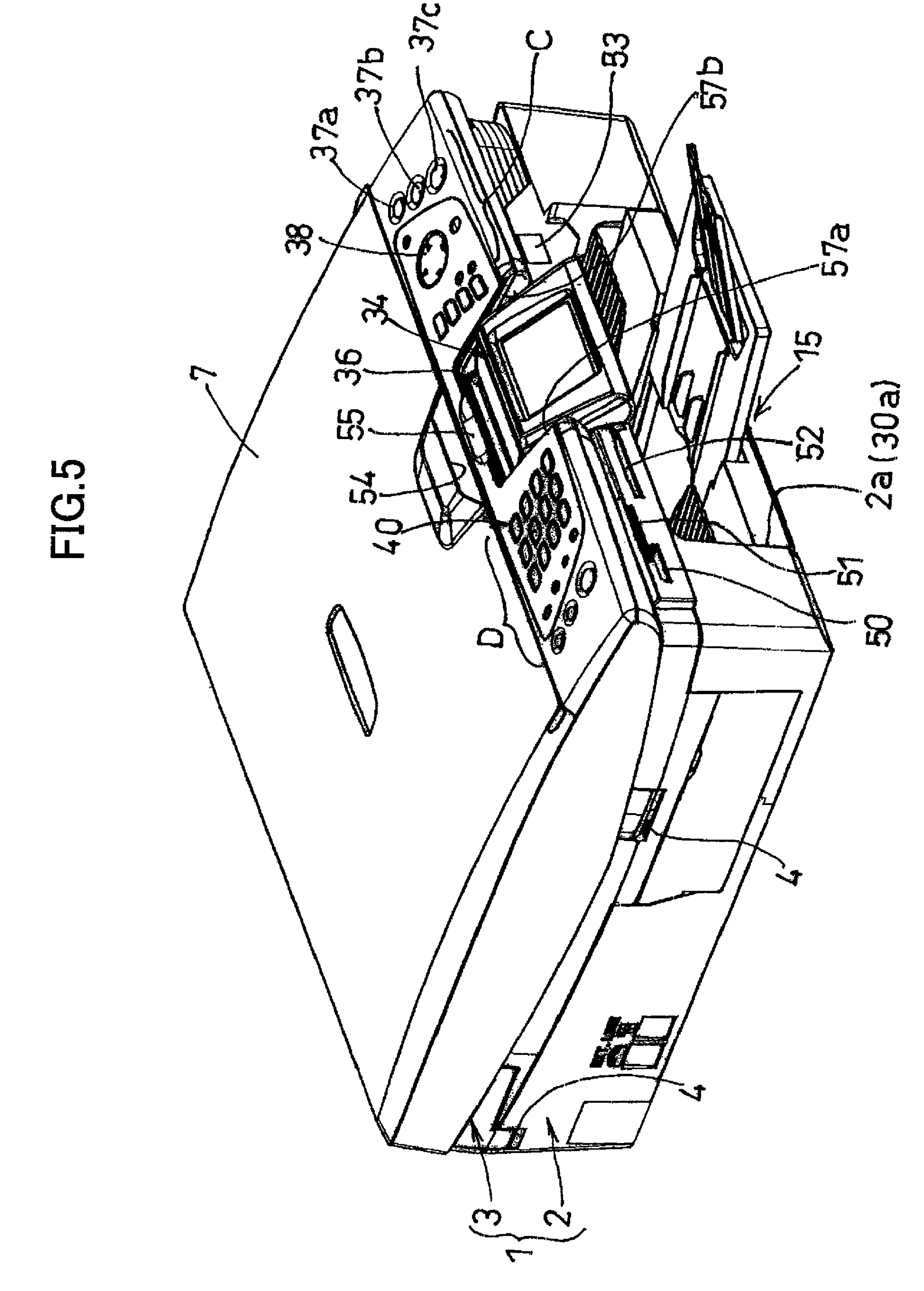
FIG. 5 is a perspective view showing the state where a liquid crystal display panel in the image recording device in accordance with the first illustrative example is inclined frontward.
Figure 6:
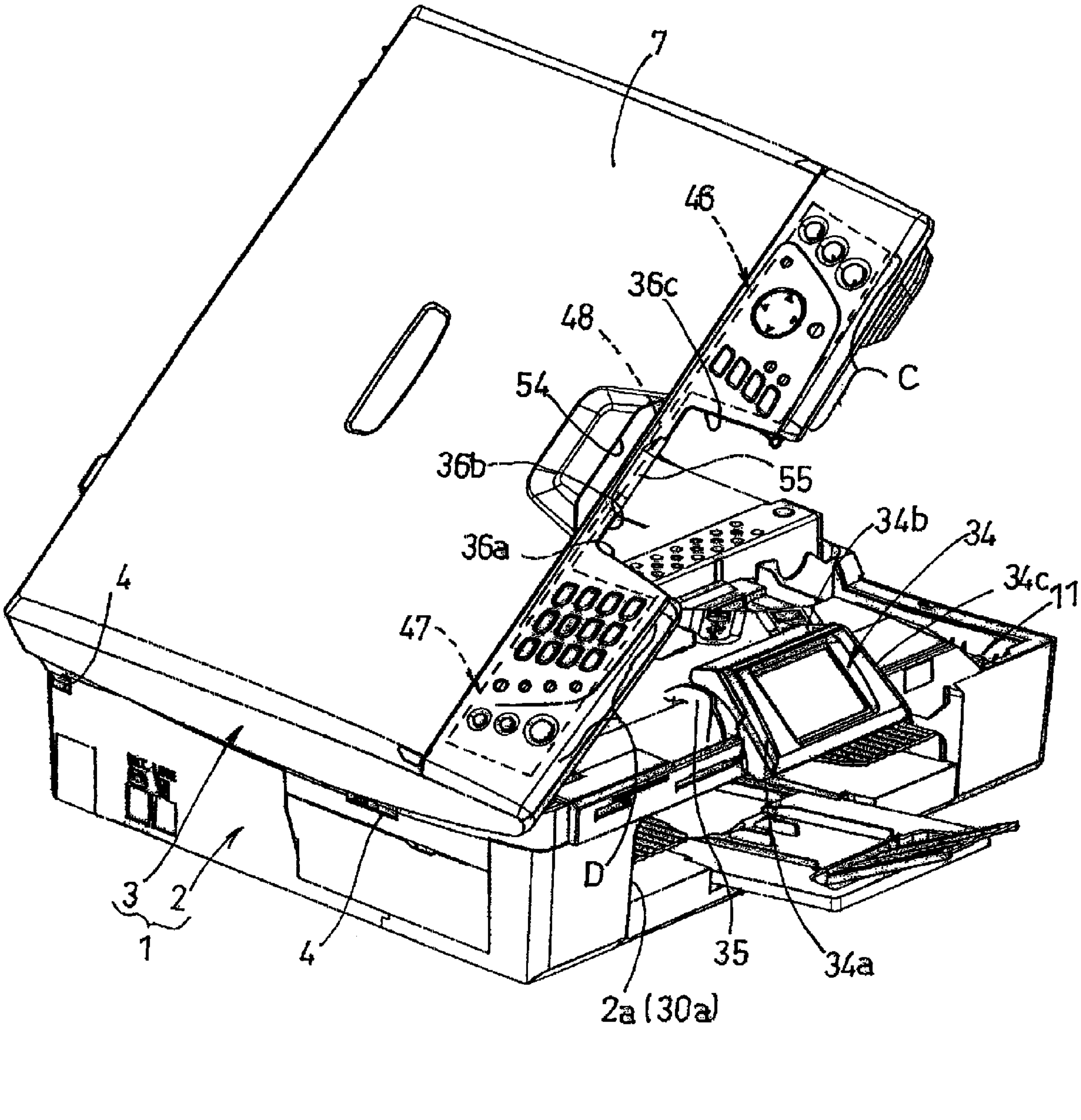
FIG. 6 is a perspective view showing the state where an upper main body in the image recording device in accordance with the first illustrative example is opened widely.
Figure 7:
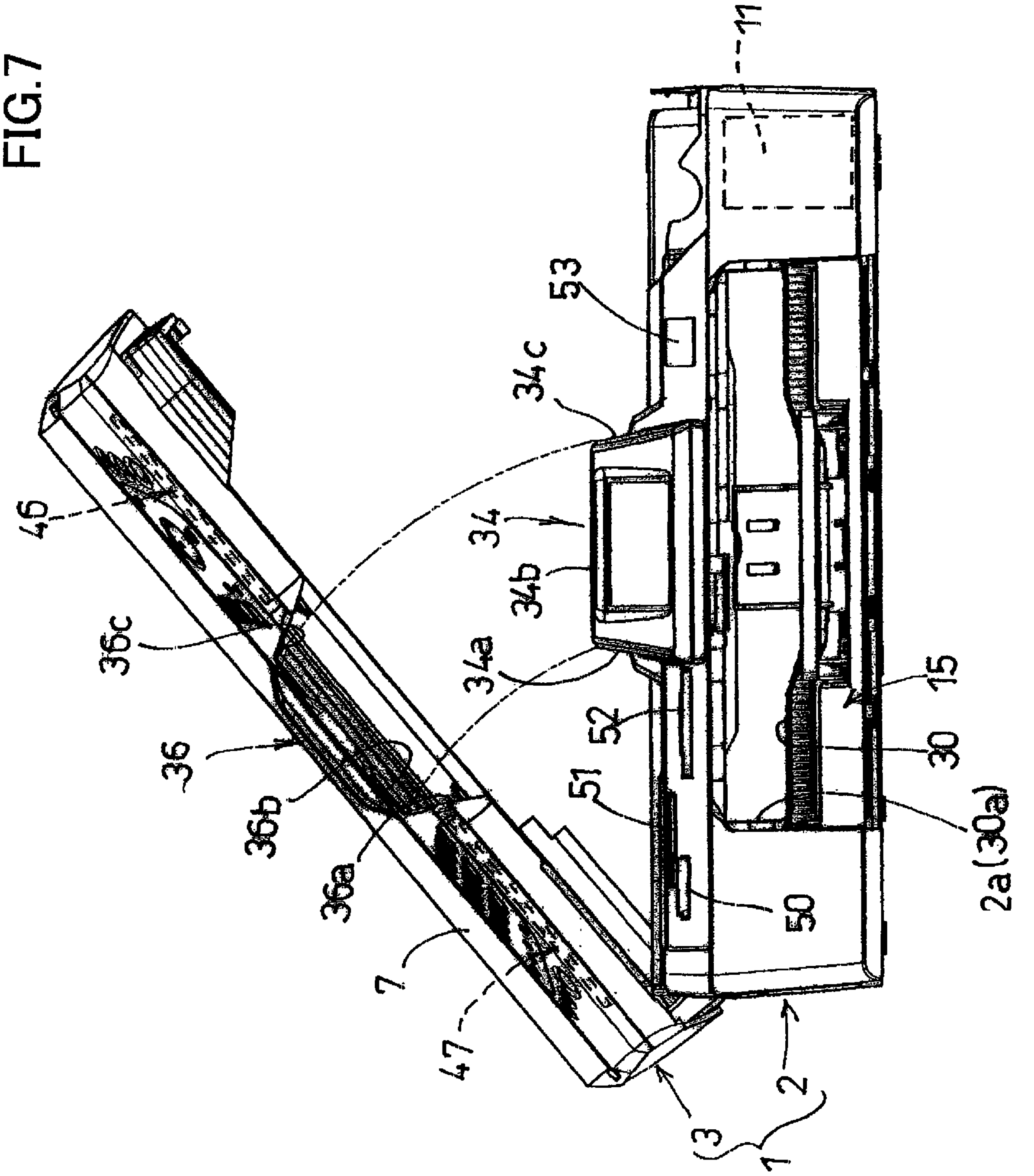
FIG. 7 is a front view showing the image recording device in FIG. 6.
Figure 8:
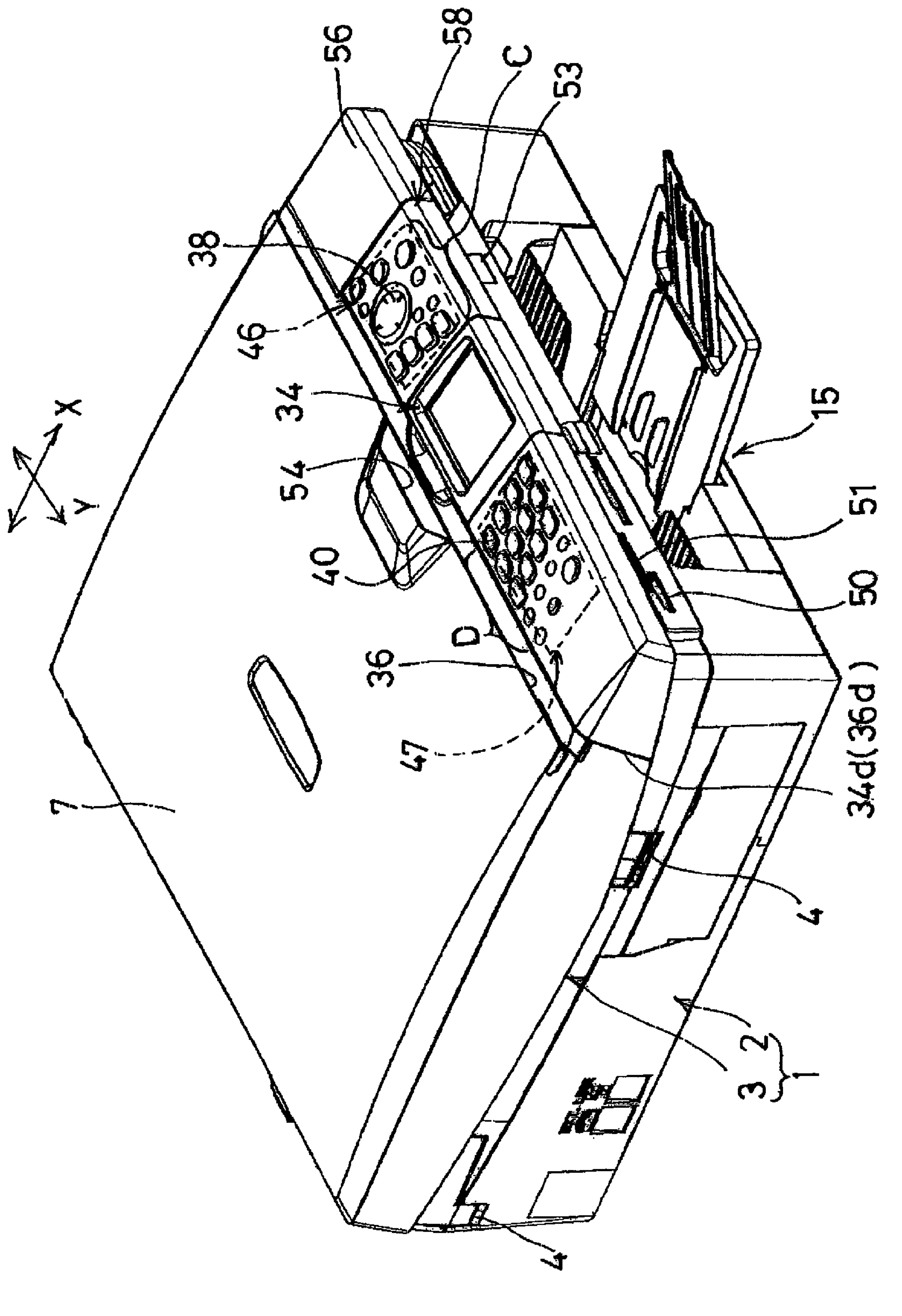
FIG. 8 is a perspective view showing an image recording device in accordance with a second illustrative example of the invention.
Figure 9:
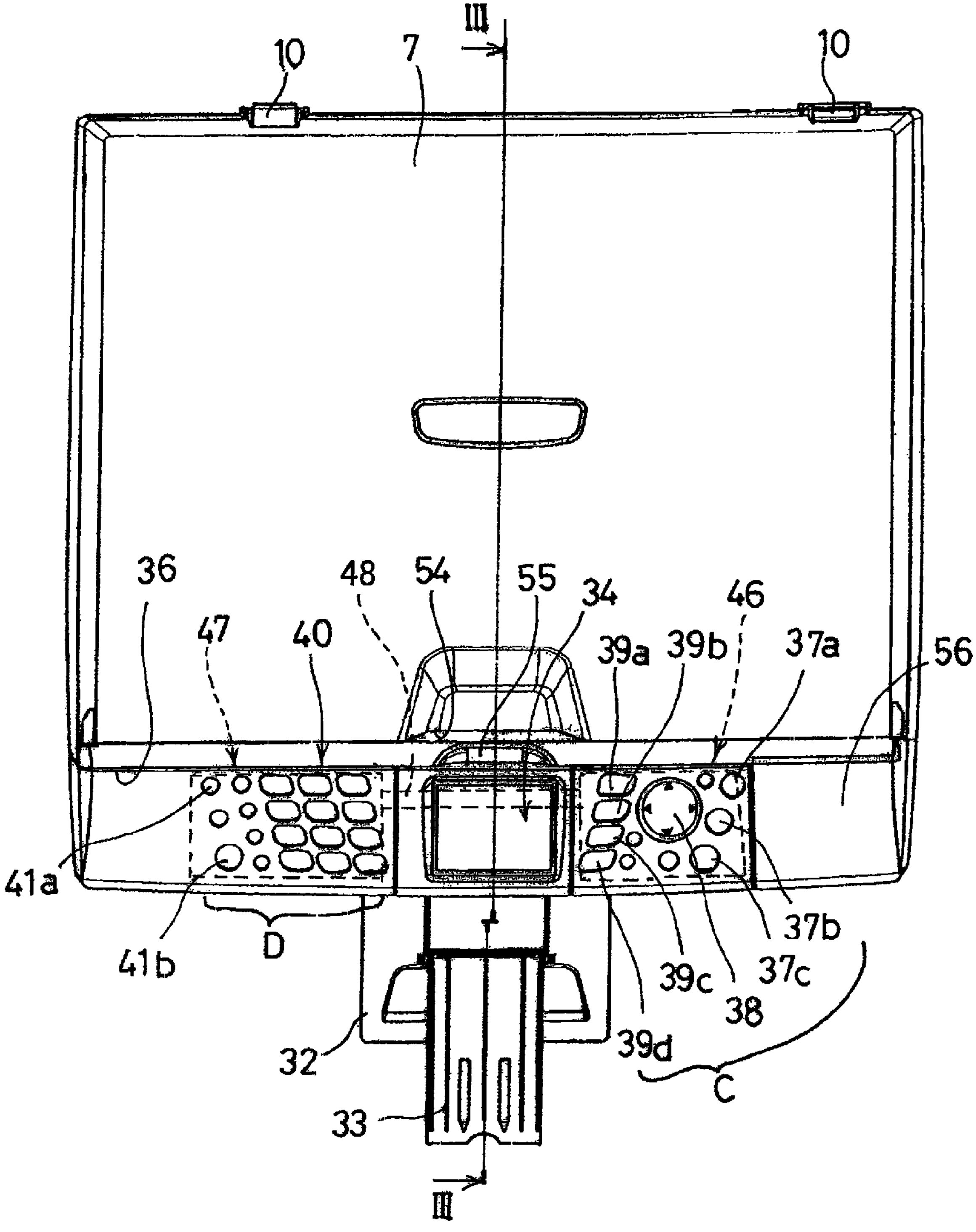
FIG. 9 is a plan view showing the image recording device in accordance with the second illustrative example.
Figure 10:
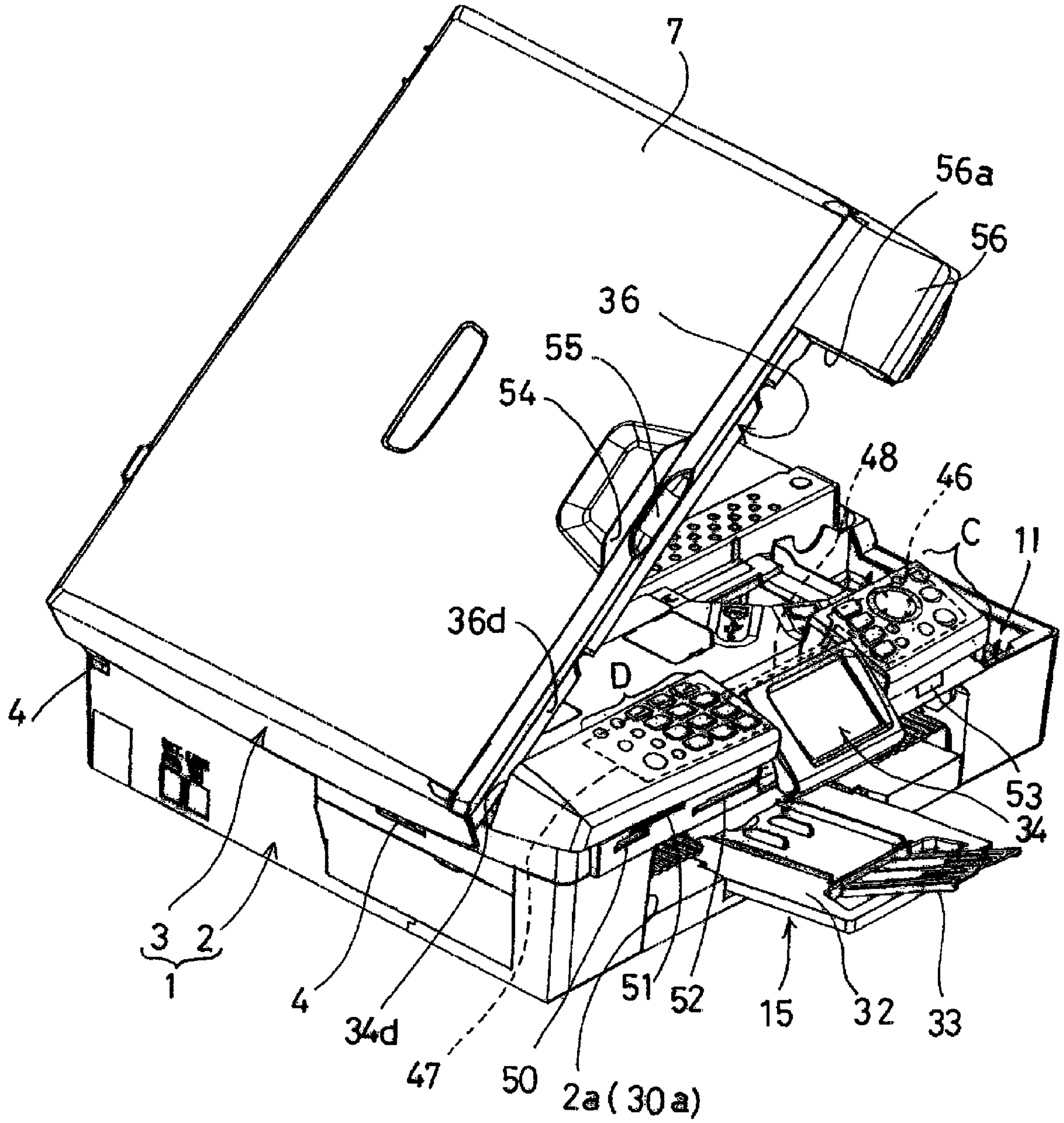
FIG. 10 is a perspective view showing the state where an upper main body in the image recording device in accordance with the second illustrative example is opened widely.
Figure 11:
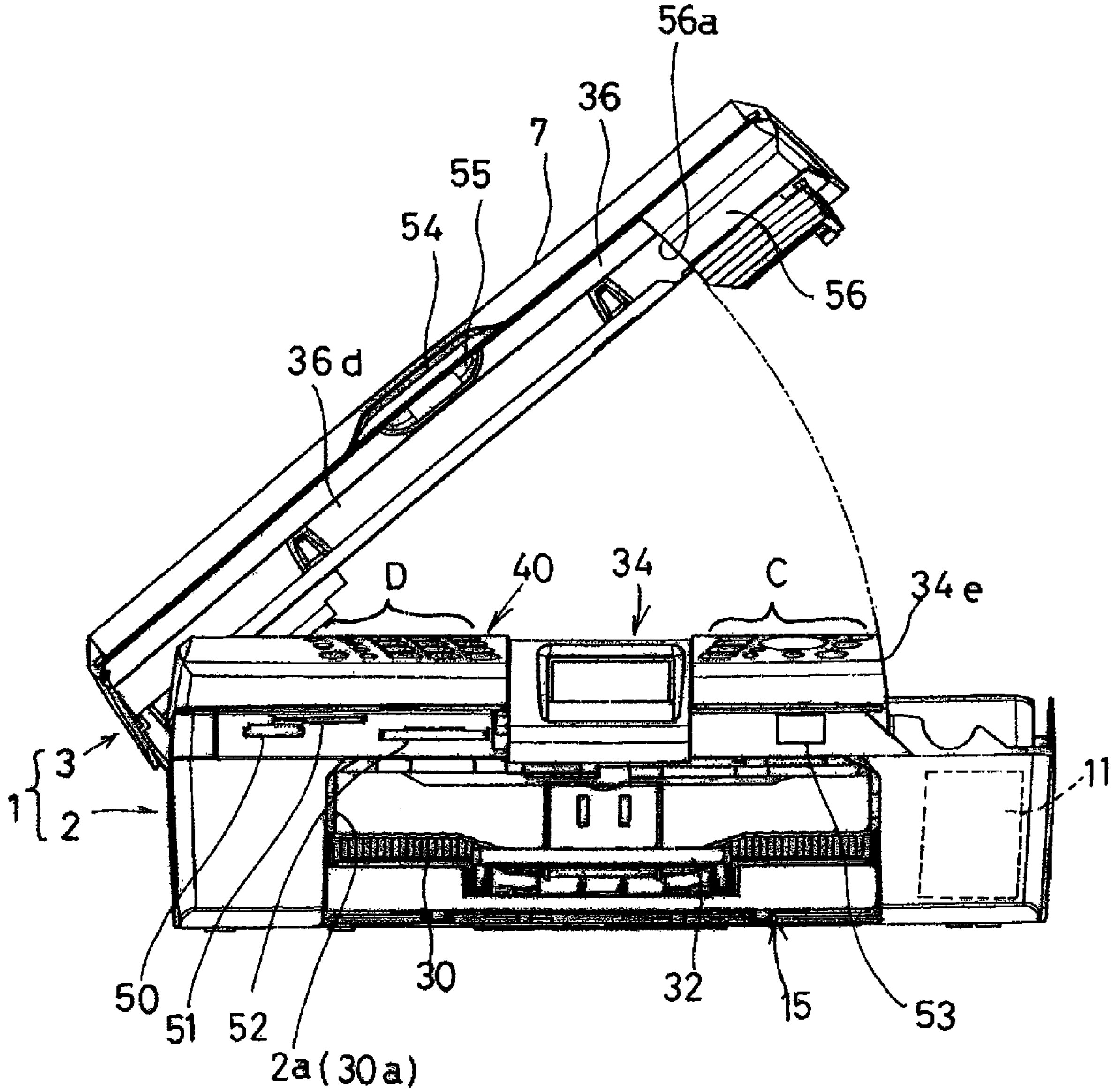
FIG. 11 is a front view showing the image recording device in FIG. 10.

Specific illustrative examples of the invention will be described below with reference to the accompanying drawings FIG. 1 is a perspective view of an image recording device in accordance with a first illustrative example of the invention. FIG. 2 is a plan view of the image recording device in accordance with the first illustrative example. FIG. 3 is a side sectional view of the image recording device in accordance with the first illustrative example when a cover member is in an open state. FIG. 4 is an enlarged side sectional view of a recording unit and a sheet feeding unit. FIG. 5 is a perspective view of the image recording device in accordance with the first illustrative example when a liquid crystal display panel has been pulled forward on a lower main body. FIG. 6 is a perspective view of the image recording device in accordance with the first illustrative example when an upper main body is opened relative to the lower main body. FIG. 7 is a front view of the image recording device in FIG. 6. FIG. 8 is a perspective view of an image recording device in accordance with a second illustrative example. FIG. 9 is a plan view of the image recording device in accordance with the second illustrative example. FIG. 10 is a perspective view of the image recording device in accordance with the second illustrative example when an upper main body is opened relative to a lower main body. FIG. 11 is a front View of the image recording device in FIG. 10.

An electrical appliance according to a first illustrative example of the invention will be described below. In the first illustrative example, the invention is applied to an image recording device 1. The image recording device 1 in accordance with this illustrative example is a multifunction device having a printing function, copying function, scanning function and facsimile transmitting/receiving function. In the first illustrative example shown in FIGS. 1 and 2, the image recording device 1 includes a lower main body 2 formed of an injection-molded synthetic resin, and an upper main body 3 formed of an injection-molded synthetic resin. The upper main body 3 is rotatably attached to a top surface of the lower main body 2.

The upper main body 3 is capable of rotating open and closed on the lower main body 2 about pivot shaft units 4 disposed on one side edge of the lower main body 2. Specifically, an opening 2*a* is formed in the front side (right side in FIG. 1) of the lower main body 2 in the illustrative example. In this case, the pivot shaft units 4 are located on the left side surface of the lower main body 2 and function as the rotational axis of the upper main body 3 relative to the lower main body 2. A document cover 7 is provided as the top surface of the upper main body 3. A rear edge of the document cover 7 is attached to the rear edge of the upper main body 3 by hinges 10 (see FIG. 2) so that the document cover 7 can rotate about the hinges 10.

As shown in FIG. 3, an image reader 5 having the copying function and the faxing function is incorporated into the upper main body 3. The image reader 5 includes a glass plate 6 on which an original document can be placed thereon by rotating the document cover 7 upward, a contact image sensor 8 disposed beneath the glass plate 6 for reading images on original documents, a guide shaft 9 extending in a direction perpendicular to the sheet surface of FIG. 3 (main scanning direction, that is, Y-axis direction in FIG. 1). The contact image sensor 8 is provided so as to be reciprocatingly movable along the guide shaft 9.

As shown in FIG. 6, an ink storage unit 11 with an open top is provided in a side of the lower main body 2 farthest from the pivot shaft units 4 (the right side in FIG. 6) for accommodating ink cartridges (not shown) of various colors. In the illustrative example, the ink storage unit 11 accommodates ink cartridges for the colors black (Bk), cyan (C), magenta (M) and yellow (Y). Each of the ink cartridges is connected to an inkjet recording head 14 in a recording unit 12 (described later) via an elastic ink supply tube at all times.

As shown in FIGS. 3 through 5, a sheet feeding cassette 15 that can be extended or retracted is disposed in a bottom section of the lower main body 2 for accommodating sheets P. The sheet feeding cassette 15 is inserted into the lower main body 2 through the opening 2*a* on the front side (right side in FIGS. 1 and 3) of the lower main body 2. In this illustrative example, the sheets P are a recording medium cut to A4 size, letter size, legal size, postcard size. A plurality of sheets P can be stacked in the sheet feeding cassette 15 such that the short edges (sides corresponding to the width) of the sheets P extend in a direction (horizontal direction, Y-axis direction) perpendicular to the sheet feeding direction (direction indicated by an arrow A).

An inclined separation plate 16 is provided on the inner side (right side in FIG. 4) of the sheet feeding cassette 15 for separating sheets. The inclined separation plate 16 is formed in a raised condition in plan view so as to protrude at the center in the width direction (Y-axis direction) of the sheet P and retreat toward both right and left ends in the width direction of the sheet P. Furthermore, a sawtooth elastic separation pad (not shown) is disposed at the center of the plate 16 in the width direction of the sheet P for contacting the leading edges of the sheets P to facilitate separation.

A sheet feeding unit 17 is disposed above the sheet feeding cassette 15. The sheet feeding unit 17 includes a sheet feeding arm 17*a* having a base end rotatably attached to the sides of the lower main body 2, a sheet feeding roller 17*b* provided at the free end of the sheet feeding arm 17*a*, and a gear transmission mechanism 17*c* through which rotation generated from a driving source (not shown) is transmitted to the sheet feeding roller 17*b*. The sheets P stacked in the sheet feeding cassette 15 are separated and conveyed one by one through the sheet feeding roller 17*b* and the elastic separation pad of the inclined separation plate 16. The sheet P separated so as to advance in the sheet feeding direction (direction shown by the arrow A) is fed to the recording unit 12 disposed above (at a higher position than) the sheet feeding cassette 15 along a conveyance path 18 including a substantially laterally-facing U-shaped path. The conveyance path 18 is formed in a gap between a first conveyance path body 18*a* forming the outer periphery of the U-shape and a second conveyance path body 18*b* forming the inner periphery of the U-shape.

As shown in FIGS. 3 and 4, the recording unit 12 is supported on a pair of left and right side plates of a box-like main frame 21 and is formed between horizontally-long plate-like first and second guide members 22 and 23 extending in the Y-axis direction (main scanning direction). Here, the first guide member 22 is positioned upstream of the second guide member 23 with respect to a sheet discharging direction (direction indicated by an arrow B). A carriage 13 on which the inkjet recording head 14 in the recording unit 12 is mounted is supported so as to freely slide reciprocatingly over the upstream first guide member 22 and the downstream second guide member 23 in the Y-axis direction.

To enable this reciprocating movement of the carriage 13, a timing belt (not shown) extending in the main scanning direction (Y-axis direction) is disposed on the top surface of the second guide member 23 positioned downstream in the sheet discharging direction (direction shown by the arrow B), and a carriage motor (not shown) for driving the timing belt is fixed to the bottom surface of the second guide member 23.

A flat platen 26 is fixed to the main flame 21 between both of the guide members 22 and 23 (see FIG. 4). The platen 26 extends in the Y-axis direction so as to oppose the bottom surface of the recording head 4 in the carriage 13.

As shown in FIG. 4, a drive roller 27 and an opposing nip roller 28 disposed below the drive roller 27 are disposed upstream of the platen 26 in the sheet discharging direction (direction indicated by the arrow B) as conveyance (registration) rollers for conveying the sheet P to the bottom surface of the recording head 4. Furthermore, a sheet discharging roller 29 driven to convey the sheet P that has passed through the recording unit 12 in the sheet discharging direction (direction indicated by the arrow B) and an opposing spur roller 29*a* urged on the side of the sheet discharging roller 29 are disposed downstream of the platen 26 in the sheet discharging direction.

A discharge tray 30 is provided on top of the feeding cassette 15. Sheets P that have been recorded in the recording unit 12 are discharged onto the discharge tray 30 with the recorded surface face up. A discharge opening 30*a* that also functions as the opening 2*a* on the front surface of the lower main body 2 is in communication with the discharge tray 30. As shown in FIG. 3, a partition plate 31 formed of a synthetic resin is integrally provided with the lower main body 2 on the downstream side with respect to the sheet discharging direction (indicated by the arrow B) for covering the discharge tray from the bottom surface of the second guide member 23 to the discharge opening 30*a* formed in the front surface of the lower main body 2.

A control circuit board 49 (see FIG. 3) for controlling the recording unit 12 and facsimile communications and the like is disposed in the lower main body 2 on top of the partition plate 31. A plurality of slots 50, 51, and 52 are provided in the front surface of the lower main body 2 for accepting various types of card-type recording media (memory cards), such as the Memory Stick (registered trademark), SmartMedia (registered trademark), CompactFlash (registered trademark), Secure Digital (SD) Card (registered trademark), and xD-Picture Card (registered trademark). A USB connector slot 53 for enabling communication with peripheral devices is provided on the right side of the front surface of the lower main body 2.

The sheet feeding cassette has a bottom plate 15*a* (see FIG. 3). As shown in FIGS. 1 and 3, a substantially plate-shaped auxiliary support member 32 is provided in the widthwise center and on the upstream end of the bottom plate 15*a* of the sheet feeding cassette 15 with respect to the sheet feeding direction (direction shown by the arrow A). The auxiliary support member 32 can be slid further outward from this upstream end in the sheet discharging direction. A sheet discharging auxiliary tray 33 is attached to the auxiliary support member 32. The sheet discharging auxiliary tray 33 can support the downstream ends of the sheets P that protrude from the discharge tray 30 in the sheet discharging direction (see FIGS. 1 through 3 and 5 through 7).

In the first illustrative example of the image recording device 1, as shown in FIGS. 1, 2 and 5 through 7, only a liquid crystal display panel 34 is provided in the vicinity of the side edge of the upper main body 2 near the front surface and in the center region of the top surface with respect to the Y-axis. Specifically, the liquid crystal display panel 34 is disposed on the top surface of the lower main body 2 in the vicinity of the side edge near the front surface of the lower main body 2, and the side edge on which the pivot shaft units 4 are arranged is perpendicular to the side edge on which the liquid crystal display panel 34 is disposed in plan view.

The liquid crystal display panel 34 has an area large enough to display a color image thereon (42 mm×54 mm in this illustrative example). The back surface (bottom surface) of the liquid crystal display panel 34 is slidably supported by a pair of arc-shaped guide rails 35 (only one rail is shown in FIGS. 3 and 6) provided on the lower main body 2. The liquid crystal display panel 34 can be arbitrarily adjusted from a position at which the surface of the display unit is nearly flush with the top surface of the lower main body 2 (see FIG. 1) to a position at which the surface of the display unit is inclined at an appropriate angle to the front surface of the lower main body 2 (an angle of about 40 degrees to the horizontal in this illustrative example; see FIGS. 3, 5, and 6)

As shown in FIGS. 5 through 7, a notched opening 36 is formed in the front part (region near the front surface) of the top surface of the upper main body 3 so that the display surface of the liquid crystal display panel 34 is exposed when the upper main body 3 is closed with respect to the top surface of the lower main body 2 about the pivot shaft units 4. In this illustrative example, the opening 36 is formed substantially in the shape of an angular letter C in plan view that opens toward the front surface of the upper main body 3 and has inner peripheral side surfaces 36*a*, 36*b*, and 36*c*. The top surface of the opening 36 may also be covered with a transparent resin plate (not shown) so that the display surface of the liquid crystal display panel 34 is viewable but not exposed when the upper main body 3 is closed with respect to the top surface of the lower main body 2.

The opening 36 has inner peripheral side surfaces 36*a*, 36*b*, and 36*c* which faces, when the upper main body 3 is closed to be disposed above the lower main body 2, the C-shaped inner peripheral side surfaces 34*a*, 34*b*, and 34*c* of the liquid crystal display panel 34, respectively. In order to prevent the upper main body 3 from impinging against the liquid crystal display panel 34 when the upper main body 3 is pivotally moved about the pivot shaft units 4, spaces 57*a* and 57*b* are provided between the corresponding side surfaces of the opening 36 and the liquid crystal display panel 34 (see FIG. 1).

In the first illustrative example, when the display surface of the liquid crystal display panel 34 is in the horizontal orientation in which the display surface is face up with respect to the top surface of the lower main body 2, the display surface is substantially at the same height or slightly lower than the height of the top surface of the upper main body 3. The display surface is thus almost in flush with operation panels C and D (described later) provided on the top surface of the lower main body 2.

When the liquid crystal display panel 34 is moved along the pair of arc-shaped guide rails 35 from the horizontal orientation to an erect orientation in which the display surface is inclined at the prescribed angle to the front surface of the lower main body 2 and the display surface is viewable from the front side, the peripheral side surfaces 34*a* and 34*c* of the liquid crystal display panel 34 do not impinge against or interfere with the opening 36 due to the spaces 57*a* and 57*b* (see FIGS. 1, 2 and 5).

To prevent the user's finger from being pinched between sharp edges of the C-shaped inner peripheral side surfaces 36*a*, 36*b* and 36*c* of the opening 36 and corresponding side surfaces 34*a*, 34*b* and 34*c* of the liquid crystal display panel 34 when the upper main body 3 is closed with respect to the lower main body 2, each of the side surfaces 36*a*, 36*b* and 36*c* and the side surfaces 34*a*, 34*b* and 34*c* form the sides of a trapezoid and slant outward from top to bottom (see FIGS. 5, 6 and 7).

The operation panels C and D are disposed in regions on the top surface of the upper main body 3 adjacent to the opening 36 on the sides farther from and nearer to the pivot shaft units 4, respectively. The operation panels C and D include input keys for specifying a plurality of functions possessed by the image recording device 1. In this illustrative example, as best shown in FIG. 2, a start/stop input key 37*a*, a color copy start input key 37*b* and a monochrome copy start input key 37*c* are aligned longitudinally in the right side of the operation panel C disposed on the right side of the opening 36. To the immediately left of these keys is disposed a cross doggle key 38 for searching pre-registered facsimile numbers, adjusting the volume of a telephone receiver, and the like. Input keys for selecting a desired function among a plurality of functions, for example, a photo capture input key 39*a*, a copy input key 39*b*, a facsimile input key 39*c* and a scanner input key 39*d* are aligned longitudinally in the adjoining region to the right of the opening 36. On the operation panel D disposed to the left of the liquid crystal display panel 34 are arranged a ten-key numeric pad 40 for inputting facsimile numbers and the like, a management report output key 41*a* and a facsimile number redial input key 41*b*.

Within the front part of the upper main body 3, a first operation panel circuit board 46 corresponding to the input key group on the right side of the opening 36 is disposed on the back side of the top surface of the upper main body 3. Stated differently, the first operation panel circuit board 46 is at a position closer to the top surface of the upper main body 3 than the bottom surface of the upper main body 3. Similarly, the second operation panel circuit board 47 corresponding to the input key group on the left side of the opening 36 is disposed on the back side of the top surface of the upper main body 3. Similar to the first operation panel circuit board 46, the second operational panel circuit board 46 is also at a position closer to the top surface of the upper main body 3 than the bottom surface of the upper main body 3.

A harness 48 runs along the inner side of a frame for the innermost side surface 36*b* of the opening 36 (see FIGS. 2 and 6). The harness 48 couples the operation panels 46 and 47 for transmitting a signal therebetween.

A handle unit, 54 is provided on the top surface of the document cover 7 near the opening 36 and enables the user to grip the document cover 7 when opening or closing the same. A recessed part 55 is formed in the top surface of the upper main body 3 near the inner side surface 36*b* of the opening 36. With this construction, the user can easily insert fingers into the recessed part 55 to move the liquid crystal display panel 34 forward or otherwise change the position of the same.

The recessed part 55 is not in communication with side edges of the glass plate 6 and the document cover 7. Therefore, external light does not enter into the space between the document cover 7 and the glass plate 6 from their side edges when the document cover 7 is closed to cover an original document placed on the glass plate 6. Image data read out from the original document is free from noises caused by the external light.

FIGS. 8 through 11 show an image recording device in accordance with a second illustrative example. This image recording device includes the liquid crystal display panel 34 centrally provided on top of the lower main body 2 with respect to the Y-axis direction in the vicinity of or along the side edge near the front surface, and the operation panels C and D provided on top of the lower main body 2. The operation panels C and D include input keys with a plurality of functions and are provided on the right and left sides of the liquid crystal display panel 34. In other words, in a plan view, the liquid crystal display panel 34 and the two operation panels C and D are provided in the vicinity of or along the side edge near the front surface of the lower main body 2, while the side edge on which the pivot shaft units 4 are disposed is perpendicular to the side edge along which the liquid crystal display panel 34 and the two operation panels C and D are aligned.

Since the types and arrangement of the input keys on the operation panels C and D in the second illustrative example are the same as those in the first illustrative example (see FIGS. 1, 2 and 5 through 7), the same reference numerals are used to designate the same or similar components and a detailed description thereof is omitted herein. The operation panel circuit boards 46 and 47 connected respectively to the operation panels C and D are accommodated in the lower main body 2 and are disposed in a position nearer to the top surface of the lower main body 2 than the bottom surface thereof. The harness 48 connects the operation panels 46 and 47 and transmits signals corresponding to instructions entered from the operation panels 46 and 47. The harness 48 is installed below the liquid crystal display panel 34 and along the inner side surface of the lower main body 2 (see FIGS. 9 and 10).

As shown in FIGS. 8 through 11, the notched opening 36 is formed in the front part (region near the front surface) of the top surface of the upper main body 3 so that the display surface of the liquid crystal display panel 34 and the operation panels C and D are exposed when the upper main body 3 is closed relative to the top surface of the lower main body 2 about the pivot, shaft units 4. In this illustrative example, the opening 36 is formed substantially rectangular in shape in plan view in the region closest to the pivot shaft units 4, opening toward the front surface of the upper main body 3. The opening 36 has an inner side surface 36*d* that opposes a side surface 34*d* of the liquid crystal display panel 34 and operation panels C and D when the upper main body 3 is closed. A cover unit 56 for covering a part of the ink storage unit 11 in the lower main body 2 is formed integrally with the top surface of the upper main body 3 on the end farthest from the pivot shaft units 4 (see FIGS. 10 and 11). In the second illustrative example, a space is provided at the right side of the liquid crystal display panel 34 for preventing the cover unit 56 from impinging against the liquid crystal display panel 34 when the upper main body 3 is closed. An operation panel C is disposed at the right side of the space adjacent to the left side surface 56*a* of the cover unit 56.

The side surface 36*d* of the opening 36 and the side surface 56*a* of the cover unit 56 oppose the inner side surfaces 34*d* and 34*e* of the liquid crystal display panel 34 and operation panels C and D when the upper main body is closed. To prevent the user's finger from being pinched between opposing sharp edges of the inner side surface 36*d* and the side surface 34*d* and between opposing sharp edges of the side surface 56*a* and the side surface 34*e* when the upper main body 3 is closed over the lower main body 2, each of the side surfaces 36*d*, 56*a*, 34*d*, and 34*e* form the sides of a trapezoid and slant outward from top to bottom (see FIGS. 10 and 11).

As a variation, the image recording device may be configured so that the liquid crystal display panel 34 is disposed on the lower main body 2 adjacent to the top surface of the ink storage unit 11, while the operation panels C and D are provided together near the pivot shaft units 4.

Since the remaining configuration is the same as that in the first illustrative example, the same reference numerals are given to similar components and a detailed description thereof is omitted. Especially note that FIG. 3 as a side sectional view taken along a line III-III in FIG. 2 is the same as a side sectional view taken along a line III-III in FIG. 9.

Figure 15:
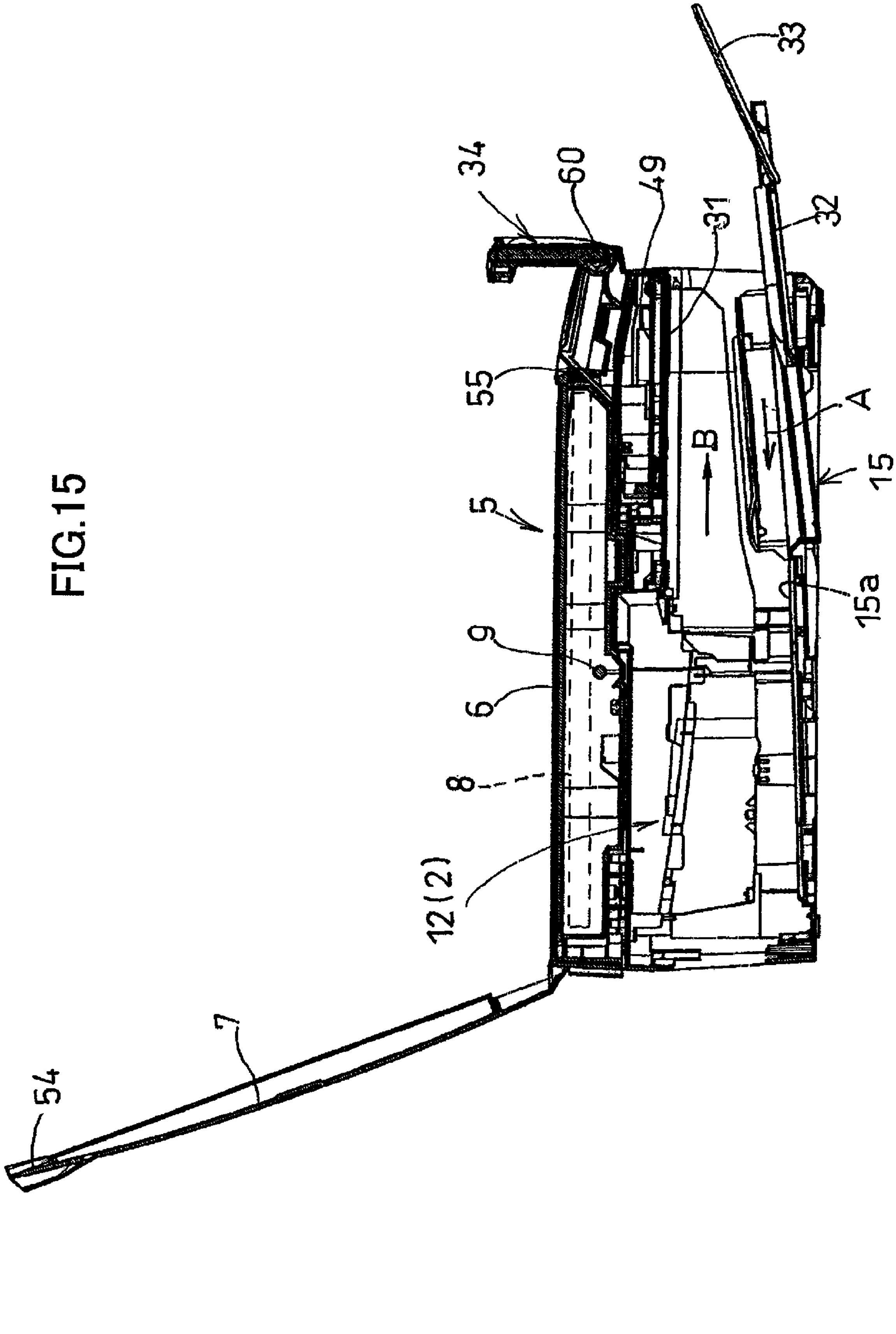
FIG. 15 is a side sectional view showing the image recording device of the third illustrative example in the state where a scanner's cover member is opened, taken along a line XV-XV in FIG. 13.
Figure 16:
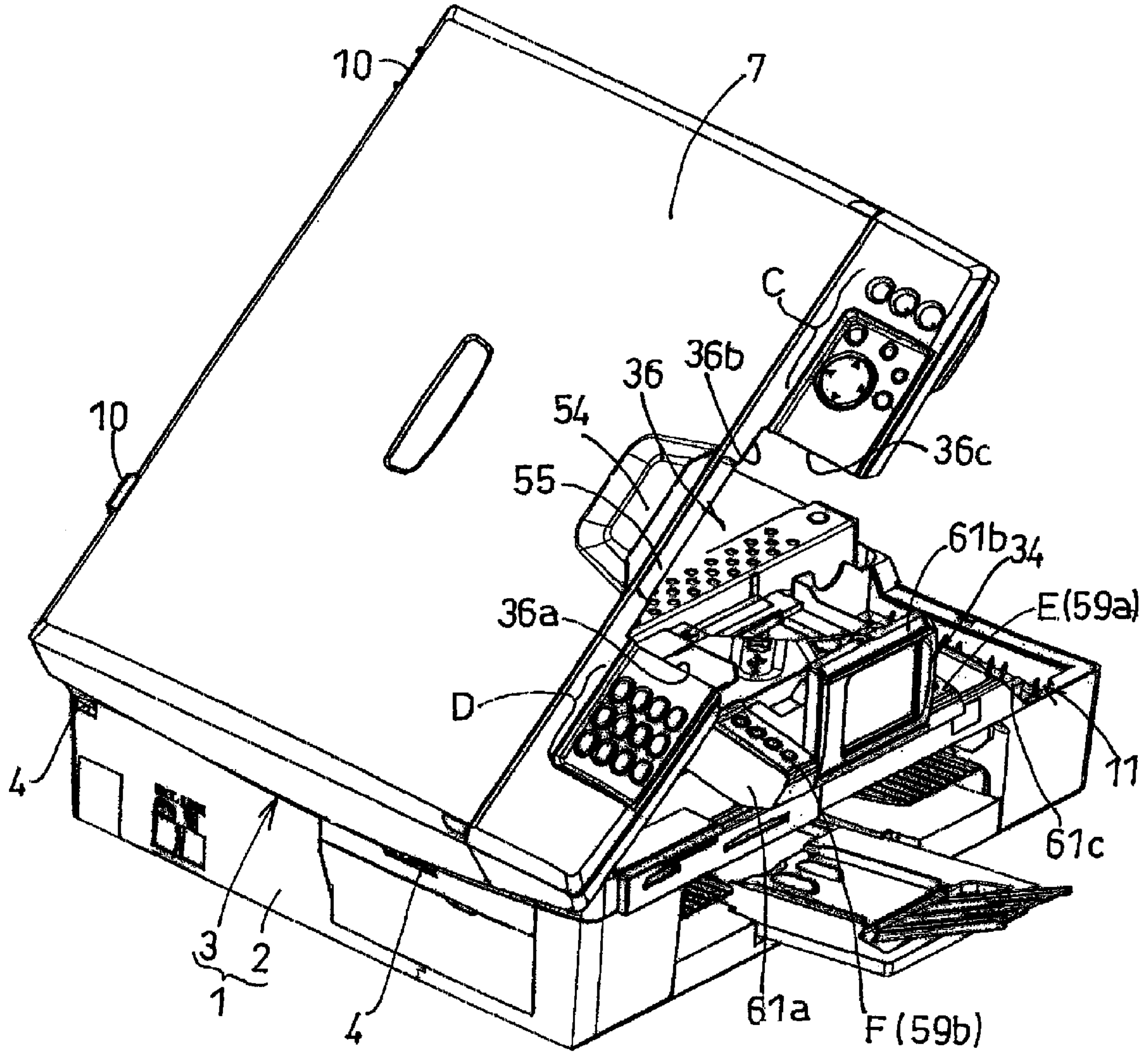
FIG. 16 is a perspective view showing the state where an upper main body in the image recording device in accordance with the third illustrative example is opened widely.
Figure 17:
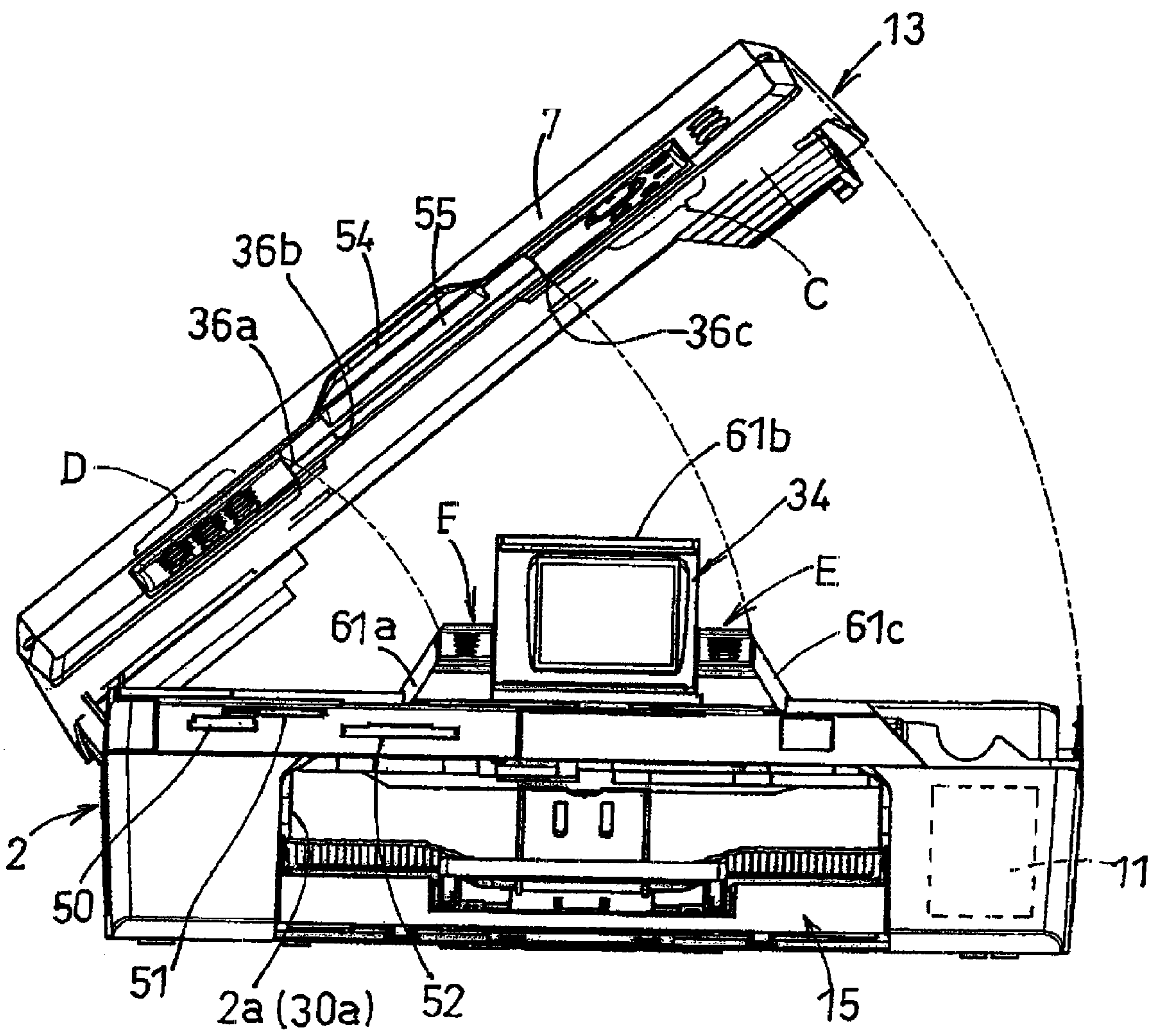
FIG. 17 is a front view showing the image recording device in FIG. 16.

A third illustrative example will be described with reference to FIGS. 12 through 17. As shown in FIGS. 16 and 17, the image recording device in accordance with the third illustrative example includes a lower main body 2 and an upper main body 3 pivotally movable about a pair of pivot shaft units 4 provided at the left side edge of the lower main body 2 to selectively be in an open state and a closed state. A liquid crystal display panel 34 is centrally provided on top of the lower main body 2 with respect to the Y-axis direction in the vicinity of or along the side edge near the front surface. The upper main body 3 is formed with an opening 36 so that the display surface of the liquid crystal display panel 34 is visible from outside of the upper main body 3 when the upper main body 3 is in the closed state.

Operation panels C and D are provided on top of the upper main body 3. The operation panels C and D include input keys with a plurality of functions and are provided on the right and left sides of the liquid crystal display panel 34. As shown in FIG. 15, the liquid crystal display panel 34 is pivotally rotatably supported on a support shaft 60 extending in Y direction at the front-side edge of the liquid crystal display panel 34. Specifically, the liquid crystal display panel 34 can change its posture between a horizontal orientation and an erect orientation. In the horizontal orientation, the display surface of the liquid crystal display panel 34 is face up and is almost flush with the upper surfaces of the operation panels arranged around the liquid crystal display panel 34. In the erect orientation, the display surface of the liquid crystal display panel 34 is oriented in the front direction so that the display surface is visible from the front side. The display panel 34 can be inclined to any angle between the two positions defined by the horizontal and erect orientations and can be held in the inclined position.

Operation panels E and F are further provided on top of the lower main body 2 at the right and left sides of the liquid crystal display panel 34. The opening 36 formed in the upper main body 3 is large enough to expose not only the display panel 34 but also the operation panels E and F.

More specifically, the opening 36 has a minimum space area to expose the liquid crystal display panel 34 when the upper main body 3 is in the closed state and an extra space area 59*a*. The extra space area 59*a* is preserved for preventing the upper main body 3 from impinging against the liquid crystal display panel 34 inclined with respect to the top surface of the lower main body 2 The extra space area 59*a* is positioned between the minimum space area and a region on the top surface of the upper main body 3 along the side edge nearest to the front surface. This region is, when the upper main body is in the closed state, adjacent to the opening 34 in the right side, i.e., the side farther from the side edge along which the pivot shaft units 4 are aligned. The operation panel E is disposed on the top surface of the lower main body 2 so as to be exposed through the extra area of the opening 36.

The opening 36 may have another extra space area 59*b* positioned between the minimum space area and a region on the top surface of the upper main body 3 along the side edge nearest to the front surface. This region is, when the upper main body is in the closed state, adjacent to the opening 34 in the left side, i.e., the side nearer to the side edge along which the pivot shaft units 4 are aligned. The operation panel F is disposed on the top surface of the lower main body 2 so as to be exposed through the extra space area 59*b* of the opening 36.

The extra space areas 59*a* and 59*b*, in particular the extra space area 59*a*, of the opening 36 serve to prevent the upper main body 3 from impinging against the upstanding liquid crystal display panel 34, as can be appreciated from FIG. 17.

As described, the liquid crystal display panel 34 and four operation panels C, D, E and F are provided in the vicinity of or along the side edge near the front surface of the lower main body 2, while the side edge on which the pivot shaft units 4 are disposed is perpendicular to the side edge along which the liquid crystal display panel 34 and the four operation panels C, D, E and F are aligned.

Referring to FIG. 17, the side surfaces 36*a* and 36*c* and the rearmost side surface 36*b* of the opening 36 oppose side surfaces 61*a* and 61*c* and the rearmost side surface 61*b* of the operation panels E and F, respectively when the upper main body is in the closed state. To prevent the user's finger from being pinched between opposing sharp edges of the opposed side surfaces when the upper main body 3 is closed over the lower main body 2, the side surfaces 36*a*, 36*b*, and 36*c* and the side surfaces 61*a*, 61*b*, and 61*c* form a trapezoidal shape slanting outward from top to bottom (see FIGS. 16 and 17).

In the third illustrative example, input keys for selecting a desired function among a plurality of functions, for example, a photo capture input key 39*a*, a copy input key 39*b*, a facsimile input key 39*c* and a scanner input key 39*d* are aligned longitudinally in the operation panel E (corresponding to the space 59*a*) disposed to the right of the liquid crystal display panel 34. On the operation panel F (corresponding to the space 59*b*) disposed to the left of the liquid crystal display panel 34 are arranged a facsimile management report output key 41*a*, a facsimile number redial input key 40*b* and the like.

Figure 12:
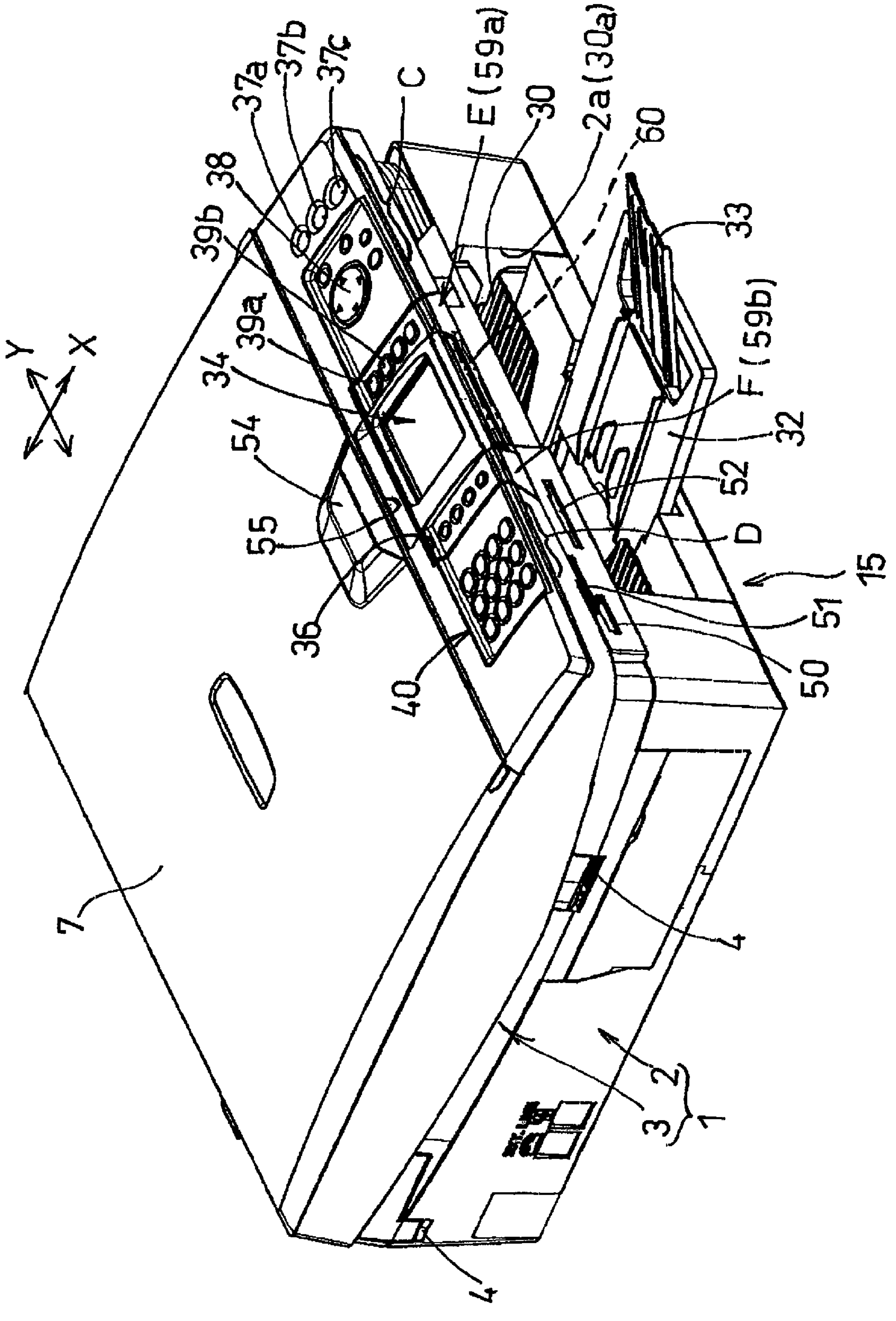
FIG. 12 is a perspective view showing an image recording device in accordance with a third illustrative example of the invention.
Figure 13:
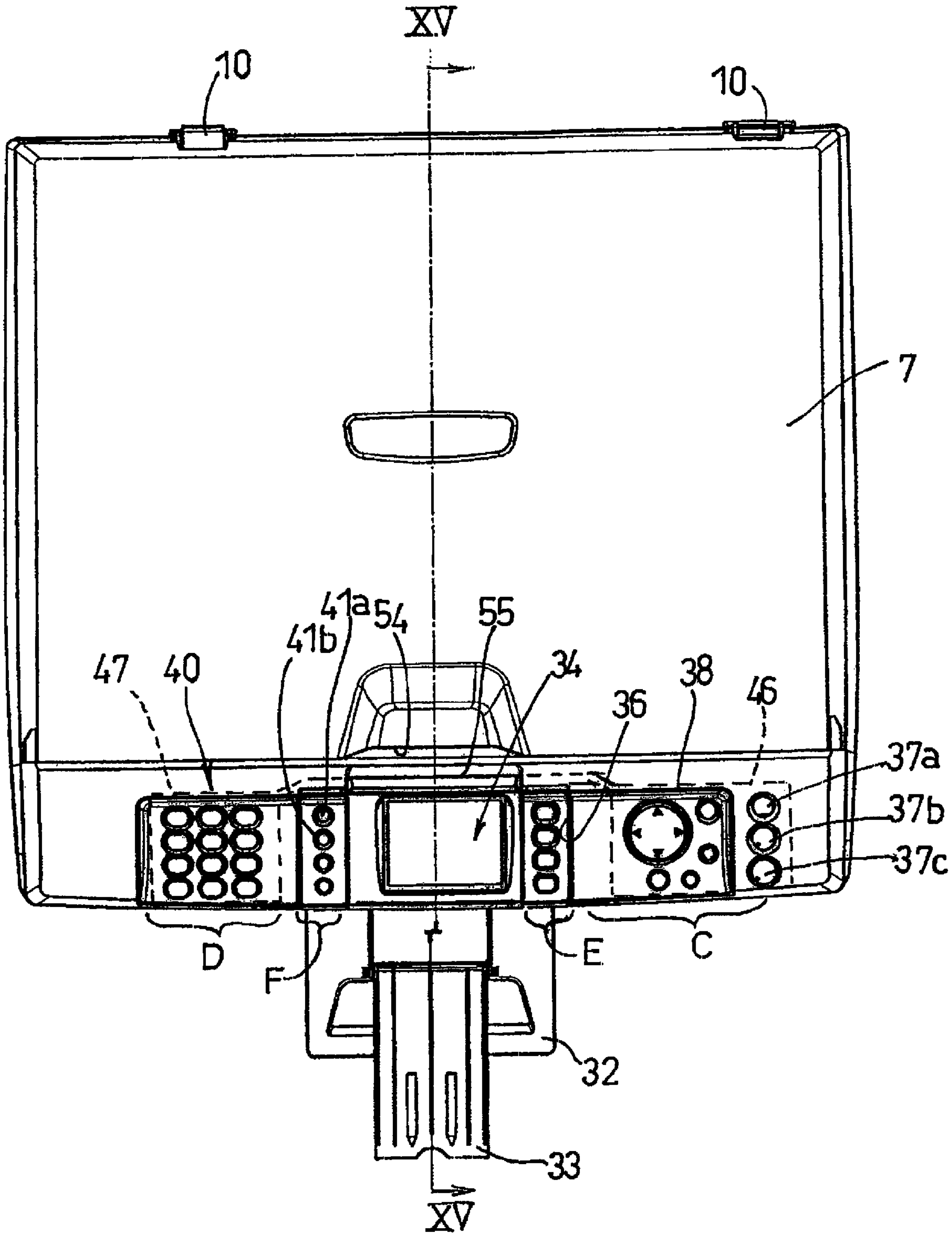
FIG. 13 is a plan view showing the image recording device in accordance with the third illustrative example of the invention.
Figure 14:
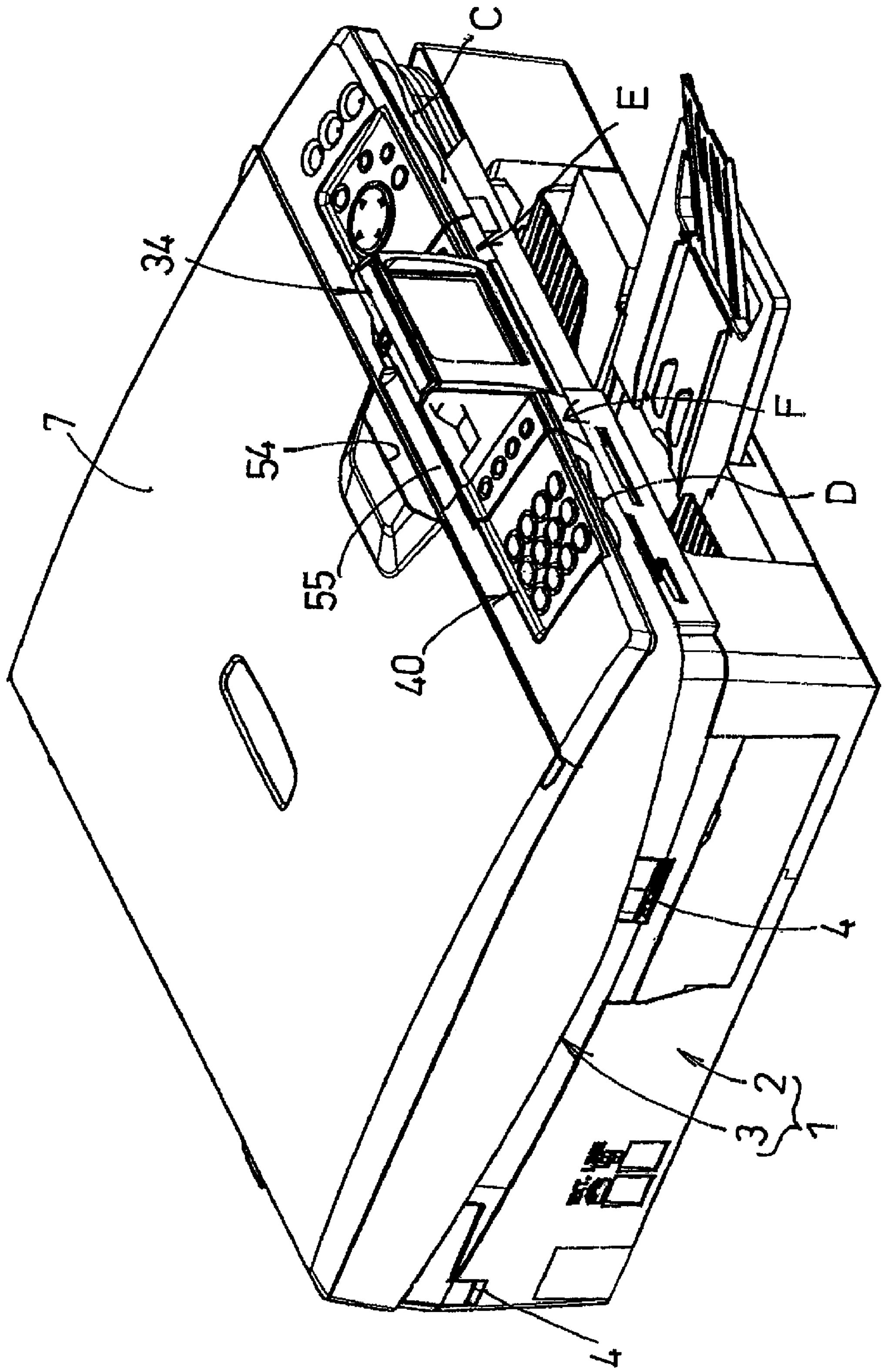
FIG. 14 is a perspective view showing an upstanding liquid crystal display panel of the image recording device in accordance with the third illustrative example.

Further, on the operation panel C disposed to the right of the opening 36 in the upper main body 3 are arranged a cross doggle key 38*a* for searching pre-registered facsimile numbers, adjusting the volume of a telephone receiver, and the like. As shown in FIGS. 12 and 13, facsimile number input keys 40 are arranged in the operation panel D disposed to the left of the opening 36.

Within the front part of the upper main body 3, a first operation panel circuit board 46 corresponding to the input key group on the right side of the opening 36 is disposed on the back side of the top surface of the upper main body 3. Similarly, the second operation panel circuit board 47 corresponding to the input key group on the left side of the opening 36 is disposed on the back side of the top surface of the upper main body 3. A harness 48 runs along the inner side of a frame for the innermost side surface 36*b* of the opening 36 (see FIG. 13).

Since the remaining configuration is the same as that in the first illustrative example, the same reference numerals are given to similar components and a detailed description thereof is omitted,.

As in the first to third illustrative examples, the provision of the slots 50, 51, and 52 and the USB connector slot 53 at the front surface of the lower main body 2 facilitates using peripheral devices and/or memory cards.

Each of the slots 50, 51, and 52 is internally provided with a supporting mechanism for supporting the inserted memory card and an interface printed circuit board for writing data into and reading data from the memory card. The liquid crystal display panel 34 is also provided with a control printed circuit board. The height of the lower main body 2 can be lowered by horizontally arranging the liquid crystal display panel 34 and the slots 50, 51, and 52, thereby making the overall image recording device 1 in compact size.

As illustrated in the first to third illustrative examples, the ink storage unit. 11 is provided in a side of the lower main body 2 farthest from the pivot shaft units 4 about which the upper main body 3 rotates. Therefore, an old ink cartridge can be easily replaced with a new one by rotating the upper main body 3 and exposing the top surface of the lower main body 2.

Further, the liquid crystal display panel 34 is disposed in a position between the pivot shaft units 4 and the ink storage unit 11 on the top surface of the lower main body 2 and close to the front surface thereof. The liquid crystal display panel 34 is not hindered from viewing by the upper main body 3 during opening the upper main body 3 or when the same has been fully opened. In addition, the orientation of the display surface is not changed caused by the rotational movement of the upper main body 3, so that the user can perform replacement of ink cartridges while viewing the display surface. It is particularly advantageous in that the user can view the display surface even if it is oriented upward. Irrespective of the direction in which the display surface is oriented, the user can read instructions on how to replace the ink cartridges displayed on the panel 34.

As described above, in the first and second illustrative examples, the upper main body 3 is rotatably attached to be freely opened relative to a side region of the lower main body 2; the liquid crystal display panel 34 is disposed on the top surface of the lower main body 2; and the opening 36 is formed on the upper main body 3 so that the display surface of the liquid crystal display panel 34 is visible when the upper main body 3 is closed with respect to the top surface of the lower main body 2. Thus, the harness for transmitting a signal from the control board 49 to the liquid crystal display panel 34 can be made shorter to prevent the harness from picking up noise and to ensure a clear and stable display of images and other data on the liquid crystal display panel 34. Furthermore, since the display surface of the liquid crystal display panel 34 is visible even during normal usage, that is, when the top surface of the lower main body 2 is covered with the upper main body 3, displayed image data and messages are easily viewable. Moreover, when the user performs such operations as maintenance and the replacement of parts when the upper main body 3 is opened relative to the lower main body 2, advantageously, the user can easily view messages for operating instructions on the liquid crystal display panel 34.

When the image recording device is configured so that the liquid crystal display panel 34 is provided on the top surface of the lower main body 2 in the vicinity of the side edge near the front surface thereof and when the side edge on which the pivot shaft unit 4 is disposed is perpendicular to the side edge on which the liquid crystal display panel 34 is disposed in plan view, the user can easily view the display surface of the liquid crystal display panel from the side close to the front surface of the lower main body 2, even when the upper main body 3 is fully open.

Generally, liquid crystal display panels have such a performance that the contrast of displayed images greatly varies depending on the viewing direction toward the display surface. The images are highly contrasted when viewed from the direction perpendicular to the display surface of the liquid crystal display panel. However, when the viewing direction changes from the direction perpendicular to the display surface, contrast of the images is degraded and the images tends to be invisible. With the liquid crystal display panel fixedly disposed on the top surface of the lower main body with no posture adjusting mechanism, the user has to move to a position where the images on the display panel is viewable.

In the first to third illustrative examples, the image recording device is configured so that the position of the display surface on the liquid crystal display panel 34 can be adjusted to any angle between a horizontal orientation and an erect orientation, therefore, the user can readily adjust the viewing angle in order to make the liquid crystal display panel 34 clearly visible.

As shown in the first to third illustrative examples, spaces 57*a* and 57*b* (or 58, 59*a*, 59*b*) are provided at the right side of or at both right and left sides of the liquid crystal display panel 34. With the presence of such spaces, the upper main body 3 does not impinge against the upstanding liquid crystal display panel 34. In other words, the upper main body 3 can be opened or closed while maintaining the liquid crystal display panel 3 at the upstanding condition. Thus, maintenance of the image recording device can be easily performed.

As in the first illustrative example, input keys used for specifying various functions of the image recording device 1 are arranged in regions on the top surface of the upper main body 3 adjacent to the opening 36 on both sides farther from and nearer to the pivot shaft units 4. Hence, the user's fingers do not touch the input keys when the user performs operations such as maintenance and the replacement of parts and consumables, including ink cartridges, while the upper main body 3 is open, thereby preventing malfunctions. When one of the pair of input key groups disposed on either side of the opening 36 is a ten-key numeric pad, the above-described configuration can prevent the accidental input of telephone and facsimile numbers, in particular.

As in the first illustrative example, when the operation panels C and D having the input keys are disposed on the top surface of the upper main body 3, the operation panels C and D are disposed in regions adjacent to the opening 36 both farther from and closer to the pivot shaft unit 4 (rotational axis), respectively. Accordingly, the length of the harness connecting both operation panel circuit boards to each other along the inner region adjacent to the notched opening can be shortened, thereby reducing the amount of noise picked up by the harness.

As in the second illustrative example, input keys used for specifying various functions of the image recording device 1 are arranged in regions on the top surface of the lower main body 2 on both or either of the regions closer to and farther from the pivot shaft unit 4 and adjacent to the liquid crystal display panel 34. Accordingly, input keys used when performing such operations as maintenance and the replacement of parts and consumables including ink cartridges are easily accessible. When one of the pair of input key groups disposed on either side of the liquid crystal display panel 34 is a ten-key numeric pad, the above-described configuration can facilitate the input of telephone numbers for a service center, for example.

As in the second illustrative example, the operation panel circuit boards 46 and 47 are arranged near the top surface of the lower main body 2 in the regions closer to and farther from the pivot shaft units 4 on either side of the liquid crystal display panel 34. Further, the harness 48 connecting the operation panel circuit boards 46 and 47 to each other is installed in the region running below the liquid crystal display panel 34. In this case as well, the length of the harness 48 can be shortened, thereby preventing noise from being picked up.

It would be apparent, for those skilled in the art that the invention can be applied to various electronic appliances other than the multifunctional image recording device 1 described above while achieving the above-mentioned operations and effects.

Although the invention has been described with respect to specific illustrative examples, it will be appreciated by one skilled in the art that a variety of changes may be made without departing from the scope of the invention.

What is claimed is:

1. An electrical appliance comprising:

an upper main body having a top surface;

a lower main body having a top surface, a bottom surface, an outer side surface, a first side edge, and a second side edge substantially perpendicular to the first side edge, the upper main body being pivotally movable about the first side edge of the lower main body to selectively be in an open state in which the top surface of the lower main body is exposed and a closed state in which the top surface of the lower main body is unexposed by the upper main body disposed above the lower main body; and a liquid crystal display panel having a display surface and disposed on the top surface of the lower main body, wherein the upper main body is formed with an opening so that the display surface is visible from outside of the upper main body when the upper main body is in the closed state, wherein the liquid crystal display panel is adjustable to any angle between the horizontal orientation in which the display surface is face up and substantially in flush with the top surface of the upper main body and an erect orientation in which the display surface is inclined at a prescribed angle with respect to the top surface of the lower main body to be viewable from a direction facing the second side edge, an edge of the display surface being parallel with the second side edge when the liquid crystal display panel is adjusted to any angle between the horizontal orientation and the erect orientation.

2. The electrical appliance according to claim 1, wherein the liquid crystal display panel is disposed along the second side edge of the lower main body.

3. The electrical appliance according to claim 2, wherein the liquid crystal display panel is disposed centrally along the second side edge of the lower main body.

4. The electrical appliance according to claim 1, wherein the opening has an inner peripheral side surface contiguous to the outer side surface of the lower main body.

5. The electrical appliance according to claim 1, wherein the opening formed in the upper main body has an area large enough to prevent the upper main body from impinging against the liquid crystal display panel inclined with respect, to the top surface of the lower main body.

6. The electrical appliance according to claim 5, wherein the opening has a minimum area to expose the liquid crystal display panel when the upper main body is in the closed state and an extra area preserved for preventing the upper main body from impinging against the liquid crystal display panel inclined with respect to the top surface of the lower main body, the extra area being positioned between the minimum area and a region on the top surface of the upper main body along the second side edge when the upper main body is in the closed state, the region being adjacent to the opening in a side farther from the first side edge.

7. The electrical appliance according to claim 6, further comprising an operation panel disposed on the top surface of the lower main body so that the operation panel is exposed through the extra area.

8. The electrical appliance according to claim 5, further comprising a recording media receiving slot formed in the outer side surface of the lower main body, the recording media receiving slot being positioned adjacent to the liquid crystal display panel.

9. The electrical appliance according to claim 1, further comprising an inkjet recording section that records images on a recording medium with ink, and an ink storage portion that supplies ink to the inkjet recording section, wherein the ink storage portion is located inside the lower main body in a position farthest from the first side edge of the lower main body.

10. The electrical appliance according to claim 9, wherein the ink storage portion is exposed on the top surface of the lower main body.

11. The electrical appliance according to claim 1, further comprising:

a first operation panel disposed on the top surface of the upper main body and arranged along the second side edge of the lower main body to be in side-by-side relation with the liquid crystal display panel when the upper main body is in the closed state;

a first operation panel circuit board; and a first harness that connects the first operation panel with the first operation panel circuit board.

12. The electrical appliance according to claim 11, wherein the first operation panel circuit board is accommodated in the upper main body and disposed at a position closer to the top surface of the upper main body than the top surface of the lower main body.

13. The electrical appliance according to claim 12, wherein the first harness extends along at least a portion of the inner peripheral side surface of the opening.

14. The electrical appliance according to claim 11, further comprising:

a second operation panel disposed on the top surface of the upper main body and arranged along the second side edge of the lower main body to be in side-by-side relation with the liquid crystal display panel and in opposition to the first operation panel with the liquid crystal display panel intervened between the first operation panel and the second operation panel when the upper main body is in the closed state;

a second operation panel circuit board; and a second harness that connects the second operation panel with the second operation panel circuit board.

15. The electrical appliance according to claim 14, wherein a first group of input keys each instructing to achieve a prescribed function is arranged on the first operation panel, and a second group of input keys each instructing to achieve a prescribed function is arranged on the second operation panel.

16. The electrical appliance according to claim 15, wherein the second operation panel circuit board is accommodated in the upper main body and disposed at a position closer to the upper surface of the upper main body than the upper surface of the lower main body.

17. The electrical appliance according to claim 15, wherein the second harness extends along at least a portion of the inner peripheral side surface of the opening.

18. The electrical appliance according to claim 15, wherein the first operation panel includes a ten-key numeric pad.

19. The electrical appliance according to claim 11, further comprising:

a feeding unit that is disposed in the lower main body and feeds a recording medium;

a recording unit that is disposed in the lower main body and forms images on the recording medium supplied from the feeding unit;

a control circuit board that is disposed in the lower main body and controls facsimile transmission/reception; and a scanner unit that is reciprocally movably disposed in the upper main body and picks up images on an original document.

20. The electrical appliance according to claim 1, further comprising:

a first operation panel disposed on the top surface of the lower main body and arranged along the second side edge of the lower main body to be in side-by-side relation with the liquid crystal display panel;

a first operation panel circuit board; and a first harness that connects the first operation panel with the first operation panel circuit board.

21. The electrical appliance according to claim 20, wherein the first operation panel circuit board is accommodated in the lower main body and disposed at a position closer to the top surface of the lower main body than the bottom surface of the lower main body.

22. The electrical appliance according to claim 20, wherein the first harness is disposed in a position lower than a position in which the liquid crystal display panel is disposed.

23. The electrical appliance according to claim 20, further comprising:

a second operation panel disposed on the top surface of the lower main body and arranged along the second side edge of the lower main body to be in side-by-side relation with the liquid crystal display panel and in opposition to the first operation panel with the liquid crystal display panel intervened between the first operation panel and the second operation panel;

a second operation panel circuit board; and a second harness that connects the second operation panel with the second operation panel circuit board.

24. The electrical appliance according to claim 23, wherein a first group of input keys each instructing to achieve a prescribed function is arranged on the first operation panel, and a second group of input keys each instructing to achieve a prescribed function is arranged on the second operation panel.

25. The electrical appliance according to claim 24, wherein second operation panel circuit board is accommodated in the lower main body and disposed at a position closer to the top surface of the lower main body than the bottom surface of the lower main body.

26. The electrical appliance according to claim 23, wherein the second harness is disposed in a position lower than the position in which the liquid crystal display panel is disposed.

27. The electrical appliance according to claim 24, wherein the first operation panel includes a ten-key numeric pad.

28. The electrical appliance according to claim 27, further comprising:

a feeding unit that is disposed in the lower main body and feeds a recording medium;

a recording unit that is disposed in the lower main body and forms images on the recording medium supplied from the feeding unit;

a control circuit board that is disposed in the lower main body and controls facsimile transmission/reception; and a scanner unit that, is reciprocally movably disposed in the upper main body and picks up images on an original document.

29. The electrical appliance according to claim 1, wherein the upper main body has a region adjacent to the opening, the region is positioned at a side of the opening furthest from the first side edge, the region has a side surface that partially defines the opening, and the side surface of the region extends to the second side edge when the upper main body is in the closed state.

30. The electrical appliance according to claim 1, wherein the upper main body has a region adjacent to the opening, the region is positioned at a side of the opening furthest from the first side edge, and the region has a side surface that partially defines the opening, and a point of the liquid crystal display panel furthest from the first side edge, when the liquid crystal display panel is adjusted between the horizontal orientation and the erect orientation, is located between the first side edge and a locus of the side surface of the region when the upper main body moves pivotally about the first side edge.

* * * * *